US012802264B2

(12) United States Patent
Mcclintock et al.

(10) Patent No.: US 12,802,264 B2
(45) Date of Patent: Nov. 17, 2026

(54) THERMAL IMAGE-BASED OBJECT SIZE ESTIMATION TO MATE CONNECTORS OF VEHICLES

(71) Applicant: THE BOEING COMPANY, Arlington, VA (US)

(72) Inventors: Ryan P. Mcclintock, Brentwood, MO (US); Caleb G. Price, Brentwood, MO (US); Christian Louis Carini, St. Louis, MO (US)

(73) Assignee: THE BOEING COPANY, Arlington, VA (US)

( * ) Notice: Subject to any disclaimer, the term of this patent is extended or adjusted under 35 U.S.C. 154(b) by 155 days.

(21) Appl. No.: 18/800,660

(22) Filed: Aug. 12, 2024

(65) Prior Publication Data

US 2025/0329044 A1 Oct. 23, 2025

Related U.S. Application Data

(60) Provisional application No. 63/637,654, filed on Apr. 23, 2024.

(51) Int. Cl.
*G06T 7/73* (2017.01)

(52) U.S. Cl.
CPC ...... *G06T 7/73* (2017.01); *G06T 2207/10048* (2013.01); *G06T 2207/20072* (2013.01); *G06T 2207/30252* (2013.01)

(58) Field of Classification Search
CPC ............. G06T 7/73; G06T 2207/20072; G06T 2207/10048; G06T 2207/30252
See application file for complete search history.

(56) References Cited

U.S. PATENT DOCUMENTS

| | | | | |
|---|---|---|---|---|
| 7,562,847 B2 | 7/2009 | Jones | |
| 10,930,041 B2 | 2/2021 | Black et al. | |
| 2014/0306063 A1* | 10/2014 | Kusnitz | B64D 39/06 244/135 A |
| 2018/0065757 A1* | 3/2018 | Pruzan | B64D 39/04 |
| 2018/0350104 A1* | 12/2018 | Lozano | B64D 39/00 |
| 2019/0272660 A1* | 9/2019 | Black | G06T 11/00 |
| 2021/0039804 A1* | 2/2021 | Ropers | B64D 47/08 |
| 2021/0104162 A1* | 4/2021 | Nykl | G06T 7/251 |
| 2021/0256730 A1* | 8/2021 | Hunt | G06T 7/74 |
| 2022/0189034 A1* | 6/2022 | Price | G06V 10/60 |
| 2024/0362820 A1* | 10/2024 | Yang | G06T 3/00 |

* cited by examiner

*Primary Examiner* — Syed Haider
(74) *Attorney, Agent, or Firm* — Moore IP Law

(57) ABSTRACT

A device includes a thermal imaging sensor configured to generate a thermal image depicting a connector. The device also includes a vision processor coupled to the thermal imaging sensor. The vision processor is configured to obtain one or more candidate centers of the connector in the thermal image. The device is also configured to generate one or more histograms that represent alignment of normal edge vectors to radial vectors through the one or more candidate centers for one or more pixels in the thermal image. The device is configured to estimate a radius based on the one or more histograms. The device is further configured to output one or more scores indicative of a confidence that the estimated radius corresponds to the connector.

20 Claims, 10 Drawing Sheets

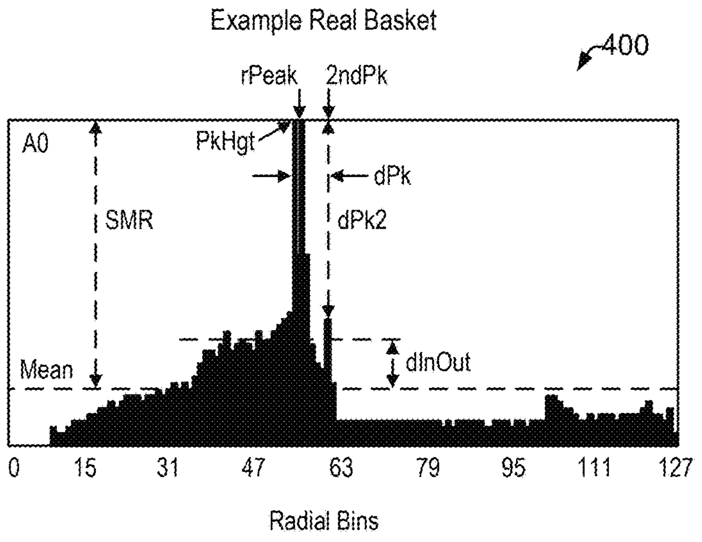

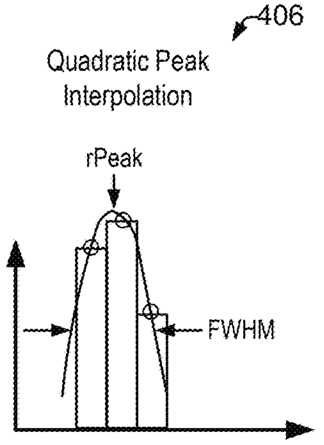

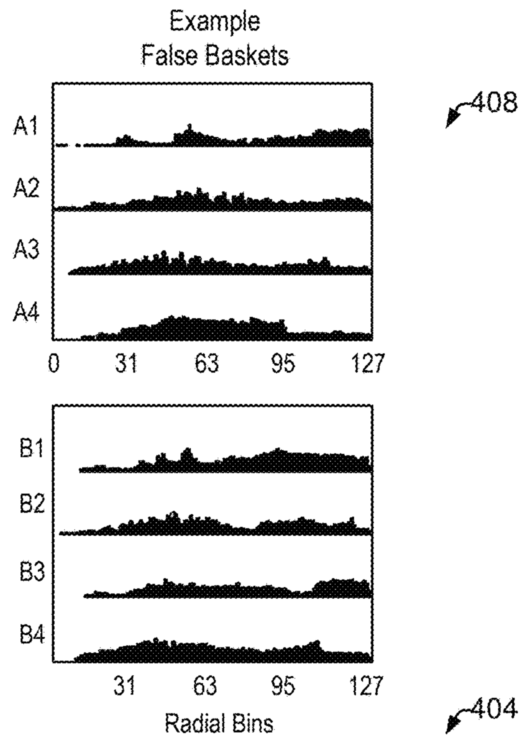

402

| RADIUS HISTOGRAM | | | | | | | | |
|---|---|---|---|---|---|---|---|---|
| Index | Range | FHWM | PkHgt | SMR | dPk2 | dPk | dInOut | dT |
| A0 | 14.73 | 1.5 | 15624 | 3.2 | -0.1 | 2.2 | 0.178 | 763 |
| A1 | 15.22 | 2.9 | 5203 | 2.1 | -0.2 | 1.2 | 0.045 | 814 |
| A2 | 16.67 | 2.9 | 4746 | 1.6 | 0.1 | 1.1 | 0.033 | 781 |
| A3 | 19.99 | 2.9 | 4881 | 1.5 | 0.1 | 1.1 | 0.028 | 804 |
| A4 | 18.16 | 3.1 | 4032 | 1.6 | 0.2 | 1.2 | 0.001 | 1266 |
| B0 | 14.62 | 2.2 | 16341 | 3.4 | 0.1 | 2.5 | 0.147 | 769 |
| B1 | 15.43 | 5.2 | 5571 | 1.3 | -0.1 | 1.0 | -0.012 | 114 |
| B2 | 14.87 | 2.7 | 5580 | 2.7 | 0.1 | 1.6 | -0.108 | 193 |
| B3 | 13.85 | 3.0 | 5503 | 1.7 | -0.1 | 1.1 | 0.004 | 1266 |
| B4 | 18.15 | 2.8 | 5825 | 1.7 | 0.2 | 1.0 | 0.031 | 906 |

| | |
|---|---|
| rPeak (Range) | Peak Radius: (from Quadratic Interpolation) |
| FWHM | Full Width at Half Maximum: (from Quadratic Interpolation) |
| PkHgt | Un-Normalized Primary Peak Height |
| SMR | Signal to Mean Ratio (Ratio of Peak Height to the Mean (~Noise Floor)) |
| dPk2 | Ratio of Primary to Secondary Peak Height |
| dPk | Radius Difference from First Peak to Second Peak |
| dInOut | Ratio of Mean Left and Right of Peak +/- 16 Pixels in Radius |
| dT | Difference Between Mean Basket 'Temperature' & Expected 'Temperature' |

FIG. 4

THERMAL IMAGE-BASED OBJECT SIZE ESTIMATION TO MATE CONNECTORS OF VEHICLES

CROSS-REFERENCE TO RELATED APPLICATIONS

The present application claims the benefit of U.S. Provisional Patent Application No. 63/637,654 entitled "THERMAL IMAGE-BASED OBJECT SIZE ESTIMATION TO MATE CONNECTORS OF VEHICLES," filed Apr. 23, 2024, the contents of which are incorporated herein by reference in their entirety.

FIELD OF THE DISCLOSURE

The present disclosure is generally related to thermal image-based object size estimation to mate connectors of vehicles.

BACKGROUND

Highly skilled human operators are typically used to guide complex, high-speed docking operations, such as air-to-air refueling and spacecraft docking operations. As such, the operations rely heavily on human judgment, which is sometimes supplemented by computer vision techniques. To illustrate, complex stereoscopic vision systems may be used to aid the human operator in mating connectors (e.g., a receiver and refueling boom or docking connectors). These docking operations can be complex and involve precision maneuvers, making such operations difficult to extend to autonomous vehicles such as drones, drone aircraft, or autonomous spacecraft. Additionally, artificial intelligence-based solutions can be challenging to test, resulting in difficulty certifying such systems with industry organizations or governments.

SUMMARY

In a particular implementation, a device includes a thermal imaging sensor configured to generate a thermal image depicting a connector. The device also includes a vision processor coupled to the thermal imaging sensor. The vision processor is configured to obtain one or more candidate centers of the connector in the thermal image. The device is also configured to generate one or more histograms that represent alignment of normal edge vectors to radial vectors through the one or more candidate centers for one or more pixels in the thermal image. The device is further configured to estimate a radius based on the one or more histograms. The device is further configured to output one or more scores indicative of a confidence that the estimated radius corresponds to the connector.

In another particular implementation, a method includes obtaining, via a thermal imaging sensor, a thermal image depicting a connector. The method also includes obtaining one or more candidate centers of the connector in the thermal image. The method includes generating one or more histograms that represent alignment of normal edge vectors to radial vectors through the one or more candidate centers for one or more pixels in the thermal image. The method further includes estimating a radius based on the one or more histograms. The method further includes outputting one or more scores indicative of a confidence that the estimate radius corresponds to the connector.

In another particular implementation, a non-transitory, computer-readable medium stores instructions that, when executed by one or more processors, cause the one or more processors to perform operations including obtaining one or more candidate centers of a connector depicted in a thermal image, the connector. The operations also include generating one or more histograms that represent alignment of normal edge vectors to radial vectors through the one or more candidate centers for one or more pixels in the thermal image. The operations include estimating a radius based on the one or more histograms. The operations further include outputting one or more scores indicative of a confidence that the estimated radius corresponds to the connector.

The features, functions, and advantages described herein can be achieved independently in various implementations or may be combined in yet other implementations, further details of which can be found with reference to the following description, drawings, and appendix.

BRIEF DESCRIPTION OF THE DRAWINGS

FIG. 4 depicts examples of histograms and values derived therefrom that support thermal image-based object size estimation to mate connectors of vehicles.

DETAILED DESCRIPTION

Figure 1A:
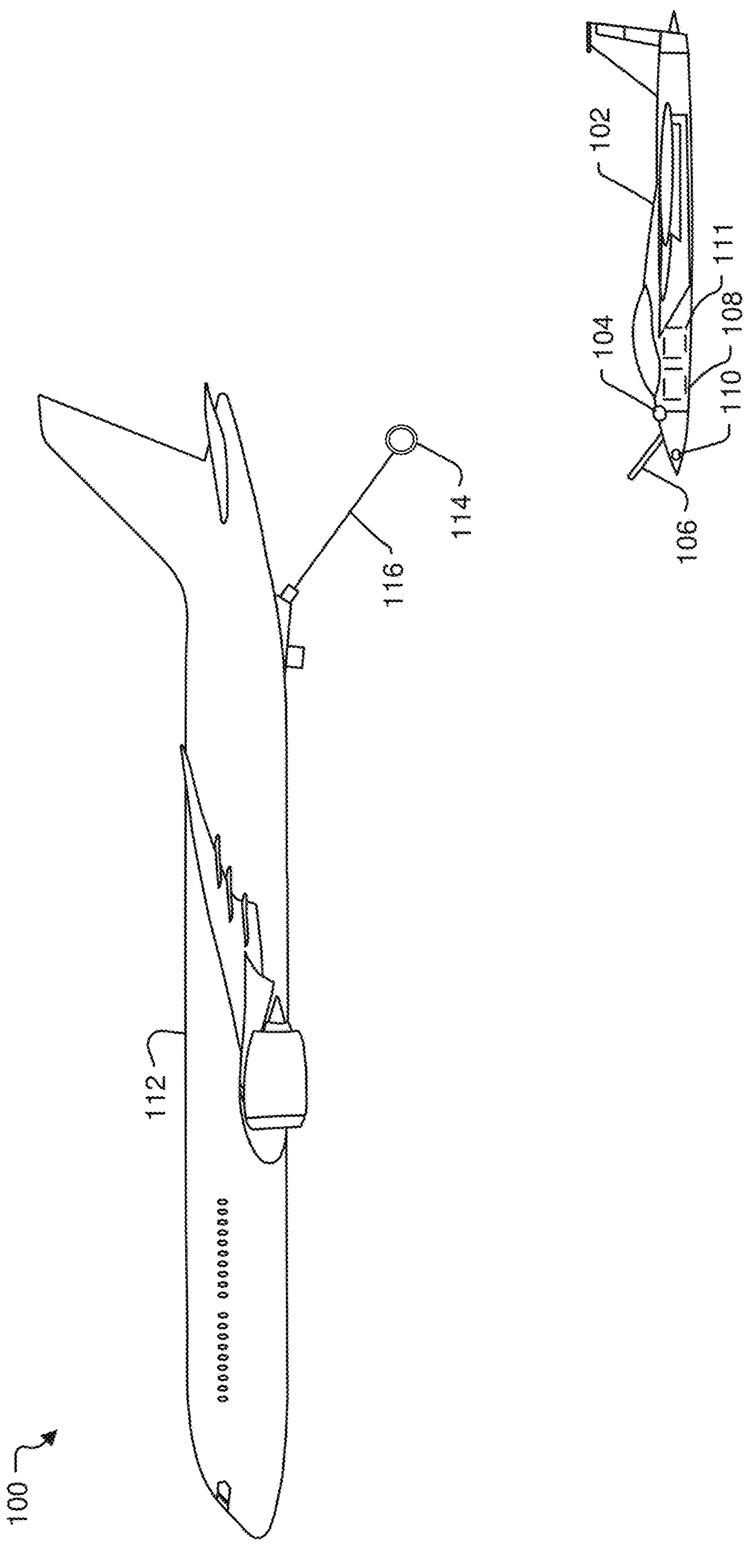
FIGS. 1A-1E illustrate examples of a system configured to perform thermal image-based object size estimation to mate connectors of vehicles.

Aspects disclosed herein present systems and methods of thermal image-based object size estimation of a connector of a vehicle to be mated with a connector of an autonomous or semi-autonomous vehicle. For example, a vision processor that resides onboard a first aircraft can process thermal image data from a thermal imaging sensor, such as an infrared camera, to identify and track a second aircraft depicted in the thermal image data. The first aircraft includes a drone aircraft, another type of autonomous aircraft or spacecraft, or a semi-autonomous aircraft or spacecraft that implements an autonomous aerial refueling receive (A2R2) capability or autonomous docking capability, and the second aircraft includes an aircraft or spacecraft, another autonomous or semi-autonomous aircraft, or an autonomous or semi-autonomous spacecraft, such as a refueling tanker, that includes a second connector with which a first connector of the first aircraft is configured to mate. In implementations described herein, the first connector includes a probe, a fuel receptacle, a docking appendage, or the like, and the second connector includes a drogue, a drogue basket, a refueling boom, a docking clamp or receptacle, or the like. In some implementations, the vision processor can provide an estimated radius of the second connector (e.g., a drogue or other substantially circular connector) to one or more other processor(s), such as a guidance processor of a navigation system, to enable the guidance processor to determine and initiate the performance of maneuvers to guide the first aircraft to mate the first connector (e.g., the probe) to the second connector (e.g., the drogue). To illustrate, by leveraging the known shape and geometry of a drogue, the vision processor can determine a high precision estimate of a distance to the drogue (e.g., a connector) and also improve confidence that a given object from another object recognition process is an aerial refueling basket or drogue, and not a different circular object, without significantly increasing the processing resources or sensors onboard an autonomous or semi-autonomous aircraft. As an example, the estimated radius output by the vision processor can enable the guidance processor to maneuver the first aircraft such that a refueling connector (e.g., the probe) is mated to a refueling port (e.g., the drogue) of the second aircraft during air-to-air refueling operations. As another example, the estimated radius output by the vision processor of a first spacecraft can enable the guidance processor to maneuver the first spacecraft such that one spacecraft is docked to another spacecraft (e.g., via mating the first and second connectors). In implementations, the vision processor is used to support the guidance processor instead of using a human operator to reduce costs, such as costs associated with training human operators and costs associated with operations to mate connectors.

In some contexts, the two aircraft performing mating (e.g., of connectors) include a primary aircraft and a secondary aircraft. Although the terms may be arbitrarily assigned in some contexts (such as where two peer aircraft are mating), generally, the primary aircraft refers to an aircraft that is connecting to the secondary aircraft to be serviced by the secondary aircraft, or the primary aircraft refers to the aircraft, onboard which the vision processor resides. To illustrate, in an air-to-air refueling context, the primary aircraft is the receiving aircraft (e.g., the aircraft to be refueled). Likewise, the secondary aircraft refers to the other aircraft of a pair of aircraft. To illustrate, in the air-to-air refueling context, the secondary aircraft is the tanker aircraft. Although predominately referred to herein as aircraft, the first aircraft and the second aircraft can also be referred to as a first device and a second device, with the term device used broadly to include an object, system, or assembly of components that is/are operated upon as a unit (e.g., in the case of the secondary device) or that operate cooperatively to achieve a task (e.g., in the case of the primary device).

In a particular aspect, the first aircraft uses a thermal imaging device (e.g., a long-wave infrared (LWIR) camera) to capture thermal images of the second connector and, optionally, at least a portion of the second aircraft. For example, the thermal imaging device can capture thermal images of a portion of a refueling tanker, such as a back portion in which the exhaust from the engines is visible, in addition or in the alternative to thermal images of the second connector, such as the drogue, coupled to the refueling tanker. The vision processor obtains a candidate center of the drogue in a thermal image, such as from an output of another object tracking or recognition operation performed on the thermal image, and the vision processor generates a histogram that represents alignment of normal vectors to radial vectors through the candidate center for one or more pixels in the thermal image. For example, for each pixel identified in a region of interest near the candidate center, the vision processor generates a normal vector through the pixel based on a gradient associated with the pixel and generates a radial vector through the pixel and the candidate center. In this example, an alignment score for the pixel is generated based on a projection of the normal vector onto the radial vector, and the histogram is generated based on an accumulation of alignment scores for pixels at each of multiple radial distances from the candidate center in the thermal image.

In aspects, the vision processor estimates a radius of the drogue basket (or other drogue or basket) based on the histogram and outputs the estimated radius to another processor, such as a guidance processor, for navigation and control of the first aircraft based on a range that is determined based on the estimated radius. For example, the vision processor can derive scores from the histogram and, if the highest radial distance scores fail to satisfy one or more threshold(s), the vision processor can modify the candidate center and generate the estimated radius based on the modified center. Alternatively, if the score(s) satisfy the threshold(s), the candidate center and a candidate radius may be accepted (e.g., as the estimated radius) and the vision processor can confirm the output of the other object tracking or recognition operation. The estimated radius can be provided to the guidance processor for use in estimating a distance (e.g., range) to the second aircraft and in determining maneuvers for the first aircraft.

One benefit of the disclosed systems and methods is that the vision processor and the thermal imaging sensor provide an all-optical, passive solution for mating connectors of vehicles during flight, such as for aerial refueling of aircraft or docking of spacecraft, which provides a high confidence solution at close range. For example, by leveraging the shape and geometry of a drogue basket (or other conical-shaped connector or basket), the vision processor described in aspects herein can calculate the gradient of thermal images to determine a high precision estimate of a distance to the drogue basket (e.g., a connector) and improve confidence that a given object identified by another object recognition process is an aerial refueling basket or drogue and not a different circular object without significantly increasing the processing resources or sensors onboard an autonomous or semi-autonomous aircraft. This high precision estimate can be used to determine operations to mate the connectors of the aircraft. The systems and methods disclosed herein can provide autonomous mating of connectors between aircraft in situations in which global positioning satellite (GPS)-based systems and/or inertial navigation system (INS)-based solutions are inoperable or have lower reliability, or in situations in which an aircraft receiving a refueling service does not include an onboard GPS or INS system, without significantly increasing cost or complexity of the systems onboard the autonomous or semi-autonomous aircraft. Additionally, or alternatively, the estimated radius provided by the vision processor can be combined with (e.g., by using as a safety check or verification for) other object recognition operations and/or for a GPS-based or INS-based solution to provide a holistic refueling or docking system with high reliability and confidence. Further, using vision-based maneuvering to control aircraft or spacecraft during complicated maneuvers, such as aerial refueling or docking, can reduce costs and resources as compared to training human operators to control the aircraft, as well as providing more predictable and repeatable maneuvers than using human operators.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, a system may be described herein as including one or more computing devices ("computing device(s)"), which indicates that in some implementations the system includes a single computing device and in other implementations the system includes multiple computing devices. For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise.

Figure 1C:
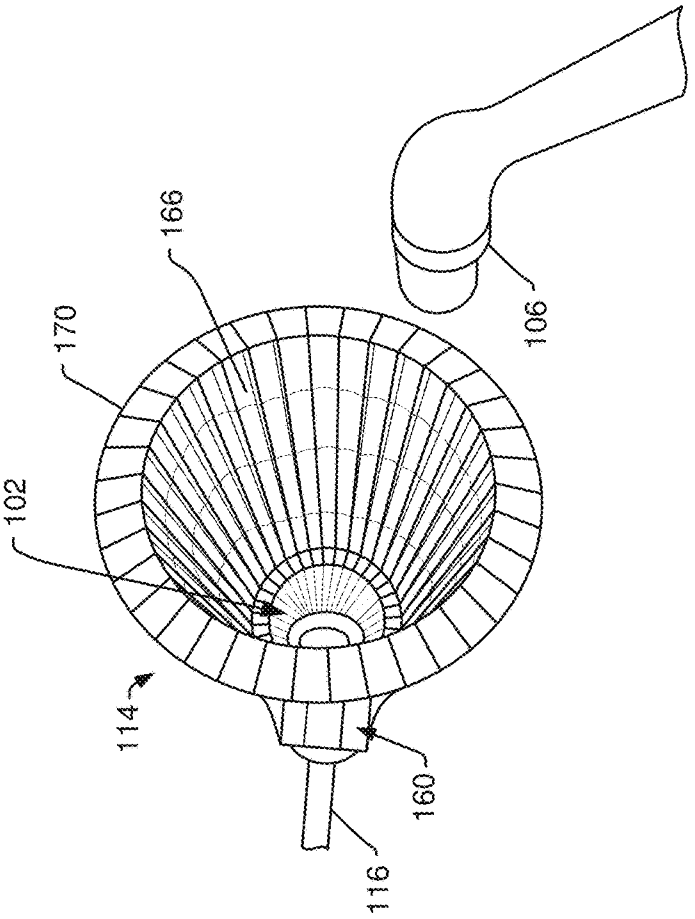
Figure 1B:
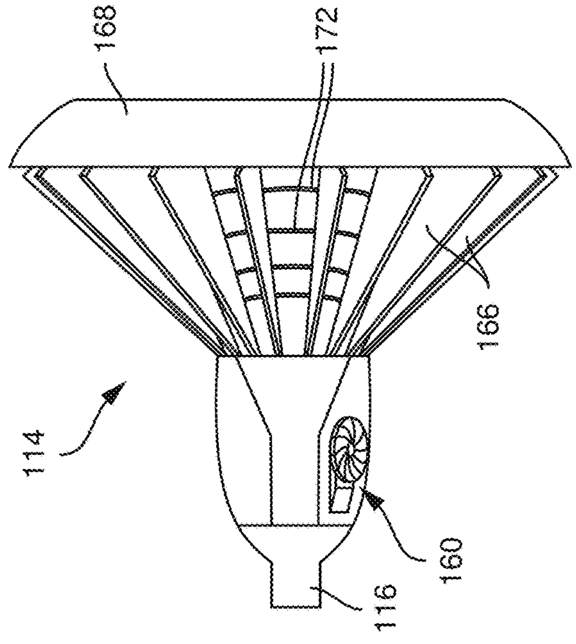
Figure 1E:
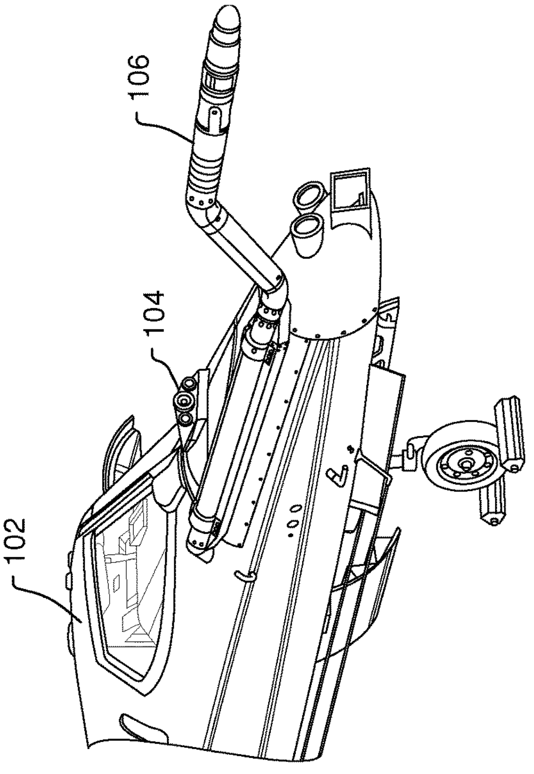
Figure 1D:
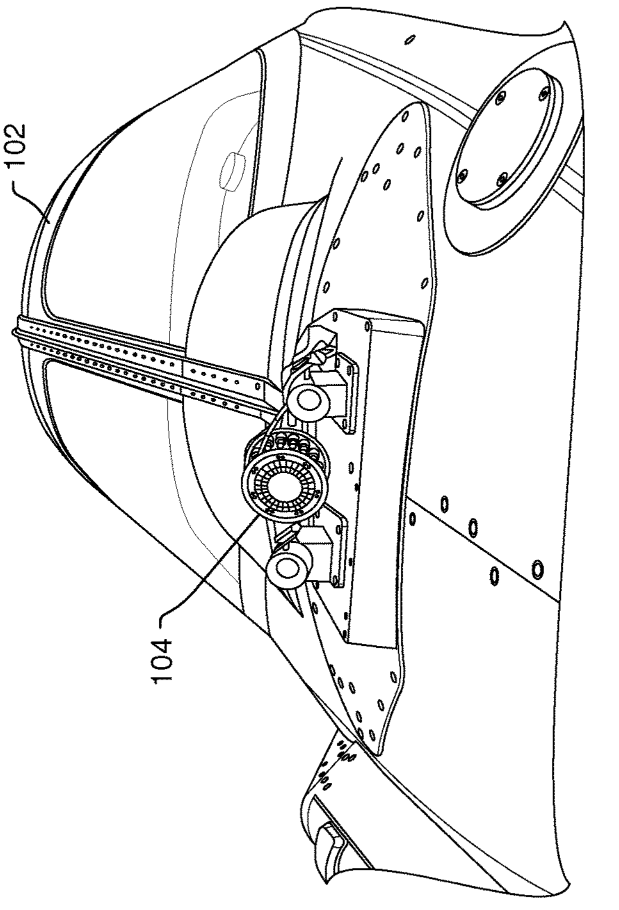

FIGS. 1A-1E illustrate examples of a system 100 configured to perform thermal image-based object size estimation to mate connectors of vehicles according to one or more aspects of the present disclosure. FIG. 1A is a diagram that illustrates the system 100 including a first aircraft 102 and a second aircraft 112. FIG. 1B is a diagram of a side-view of an example of a drogue 114 of the second aircraft 112. FIG. 1C is a diagram of an example of the drogue 114 and a probe 106 of the first aircraft 102. FIGS. 1D and 1E are each an image of an example of the first aircraft 102.

Referring to FIG. 1A, the system 100 includes the first aircraft 102 and the second aircraft 112. The first aircraft 102 is configured to support operations that identify and track the second aircraft 112 or the drogue 114 (e.g., a drogue basket or other basket) of the second aircraft 112 based on thermal image data, such that the first aircraft 102 can perform one or more maneuvers to mate the probe 106, also referred to as a first connector, of the first aircraft 102 with the drogue 114, also referred to as a second connector, of the second aircraft 112. In the example illustrated in FIG. 1A, the first aircraft 102 includes or corresponds to an autonomous, such as a drone or drone aircraft, an autonomous or semi-autonomous aircraft (e.g., an aircraft having A2R2 capability), an autonomous or semi-autonomous spacecraft, or the like (a primary device, as described above), and the second aircraft 112 includes or corresponds to a fuel tanker (a secondary device, as described above). For example, the second aircraft 112 can be configured to service or support the first aircraft 102, such as providing fuel or a refueling service, and the first aircraft 102 includes a device or system configured to couple to the second aircraft 112 and possibly to be serviced by or supported by the second aircraft 112. Although described in the context of a fuel tanker and an autonomous or semi-autonomous aircraft, in other implementations, the first aircraft 102 can include other types of aircraft or spacecraft, such as a space shuttle, and the second aircraft 112 can include other types of aircraft of spacecraft, such as a space station with which the first aircraft 102 is configured to dock.

The second aircraft 112 is coupled via a hose 116 to the drogue 114. The first aircraft 102 includes the probe 106 that is configured to couple with (e.g., physically attach to) the drogue 114. The second aircraft 112 is configured to provide fuel via the hose 116 to the first aircraft 102 while the probe 106 is coupled to the drogue 114 (e.g., an aerial refueling basket). Although the drogue 114 is illustrated in FIG. 1A as being coupled to the second aircraft 112 via the hose 116, in some other implementations, the second aircraft 112 includes a moveable coupling system configured to move the drogue 114 (or another type of connector) relative to the probe 106 (or another type of connector) of the first aircraft 102. For example, the moveable coupling system of the second aircraft 112 can include a steerable boom (e.g., a refueling boom) of a refueling system or a steerable docking arm of a docking system. The above referenced examples are merely illustrative and are not limiting. Additionally, the second aircraft 112 includes a fuel tank to supply fuel, via the hose 116 (or a refueling boom), to the first aircraft 102.

Referring to FIGS. 1B and 1C, the drogue 114 (e.g., the drogue basket) includes a reception coupling 160 and an array of structures 166 (also referred to herein as arms or spokes) extending therefrom and which support a canopy 168 at the distal ends thereof. The reception coupling 160 includes an internal passage 170 (e.g., a socket) for receiving a refueling probe (e.g., the probe 106) and is attached to a fuel hose (e.g., the hose 116). The structures 166 surround the entrance to the internal passage 170 and may each be joined to adjacent arms by couplings 172 (e.g., tie ropes, wires, or other material) for avoiding penetration between the structures 166 by the probe 106. The structures 166 may each have a planar (or substantially planar) body portion, extending radially from an opening/center of the internal passage 170 (e.g., socket) of the drogue 114.

Referring to FIGS. 1A, 1D, and 1E, the first aircraft 102 includes a thermal imaging sensor 104. In an example, the thermal imaging sensor 104 includes a long-wave infrared (LWIR) camera or another type of infrared (IR) camera. The thermal imaging sensor 104 is configured to generate thermal image data (e.g., thermal image(s)) that depicts temperature information associated with at least a portion of the second aircraft 112, the drogue 114, or a combination thereof. For example, the LWIR camera can be configured to generate thermal image data based on wavelengths ranging from 8 μm to 14 μm. In some implementations, the thermal image data represents a stream of real-time (e.g., subject to only minor video front-end processing delays and buffering) thermal image frames that represent relative temperatures and relative positions of at least a portion of the drogue 114, at least a portion of the second aircraft 112, or a combination thereof. In a particular aspect, the thermal imaging sensor 104 is located within a housing that is coupled to a hull of the first aircraft 102 and that includes an aperture that provides a field of view for the thermal imaging sensor 104. Alternatively, the thermal imaging sensor 104 can be located at or near an end of the probe 106. In some implementations, the first aircraft 102 includes multiple thermal imaging sensors 104 positioned at one or more locations with respect to the hull, the probe 106, or a combination thereof.

Referring to FIG. 1A, the first aircraft 102 also includes a vision processor 108, an optional memory (not shown in FIGS. 1A-1E), one or more additional processors 111, and optionally, one or more sensors 110. In the example illustrated in FIGS. 1A-1E, the vision processor 108 includes or corresponds to one or more image processors. In examples, the additional processor(s) 111 include or correspond to one or more guidance processors, one or more navigational processors, one or more processors of a flight control system, other types of processors, or a combination thereof. In some implementations, the vision processor 108 and the additional processor(s) 111 are combined. To illustrate, one or more graphics processing units (GPUs), one or more central processing units (CPUs), one or more field-programmable gate arrays (FPGAs), one or more digital signal processors (DSPs), or one or more other multi-core or multi-thread processing units may serve as both, or a part of, the vision processor 108 and the additional processor(s) 111. Although some implementations include the memory, in other implementations, the memory is omitted from the first aircraft 102.

The sensor(s) 110, when present, are configured to generate supplemental sensor data (e.g., additional image and/or position data) indicative of relative positions of the first aircraft 102, the second aircraft 112, and/or the drogue 114. For example, the sensor(s) 110 may include a camera, a video capture device, a light emitting diode (LED) device, position sensors (e.g., gyroscope(s), accelerometer(s), inertial navigation system (INS) sensors, and the like), and sensor data generated by the sensor(s) 110 can include additional image data, video data, position data, such as 6 degrees of freedom (6DoF) position data, INS data, or a combination thereof. Additionally, or alternatively, the sensor(s) 110 may include a range finder (e.g., a laser range finder and/or a radio with ranging capability, such as a tactical radio or radio range finder), and the sensor data generated by the sensor(s) 110 can include range data (e.g., a distance from the range finder to the second aircraft 112). Additionally, or alternatively, the sensor(s) 110 may include a radar system, and the sensor data generated by the sensor(s) 110 may include radar data (e.g., radar returns data indicating a distance to the second aircraft 112, a direction to the second aircraft 112, or both). Additionally, or alternatively, the sensor(s) 110 may include a light detection and ranging (lidar) system, and the sensor data generated by the sensor(s) 110 may include lidar data (e.g., lidar returns data indicating a distance to the second aircraft 112, a direction to the second aircraft 112, or both). Additionally, or alternatively, the sensor(s) 110 may include a sonar system, and the sensor data generated by the sensor(s) 110 may include sonar data (e.g., sonar returns data indicating a distance to the second aircraft 112, a direction to the second aircraft 112, or both). Additionally, or alternatively, the sensor(s) 110 may include one or more additional cameras (e.g., in addition to the thermal imaging sensor 104), and the sensor data generated by the sensor(s) 110 may include stereoscopic image data.

During operation, the first aircraft 102 can activate the thermal imaging sensor 104 to capture thermal image data representing at least a portion of the second aircraft 112, the drogue 114, or a combination thereof. In implementations that include the additional sensor(s) 110, the additional sensor(s) 110 capture additional sensor data associated with the second aircraft 112, the drogue 114, or both. The vision processor 108 processes the thermal image data to generate an estimated radius of the drogue 114, a score associated with the estimated radius (e.g., a confidence score), values from which the estimated radius and/or the score can be derived, or a combination thereof, and the vision processor 108 provides the estimated radius, score, and/or values to the additional processor(s) 111. In some implementations, the vision processor 108 processes the additional sensor data to generate other estimates using other techniques and the additional sensor data, and the vision processor 108 provides the other estimates to the additional processor(s) 111. In this example, the vision processor 108 can provide scores (e.g., confidence scores) associated with the estimated radius, the other estimates, or a combination thereof, to the additional processor(s) 111. The additional processor(s) 111 can determine navigation for the first aircraft 102 and/or maneuver the first aircraft 102, the probe 106, or both, based on the radius estimate(s) to engage the probe 106 with the drogue 114 to initiate refueling of the first aircraft 102. For example, the additional processor(s) 111 can estimate a range to the drogue 114 based on the estimated radius and a known geometry of the drogue 114. Alternatively, the vision processor 108 can determine the estimated range and provide the estimated range to the additional processor(s) 111. In some implementations, the vision processor 108 provides intermediate values to the additional processor(s) 111, and the additional processor(s) 111 determine the estimated radius, the score, and/or other information, based on the values received from the vision processor 108.

Although FIGS. 1A-1E depict the first aircraft 102 including the sensor(s) 110, in some implementations the sensor(s) 110 are omitted or are not used to generate input to the additional processor(s) 111. For example, an estimated radius and/or a score may be determined solely based on thermal image data output by the thermal imaging sensor 104. Additionally, or alternatively, the vision processor 108 can perform one or more additional operations to identify or track the second aircraft 112 and/or the drogue 114, including generating a candidate center of the drogue 114, such as by using the sensor(s) 110 to perform one or more other techniques.

The thermal imaging sensor 104 and the vision processor 108, in conjunction with other features of the first aircraft 102, improves efficiency (e.g., by reducing training costs), reliability, and repeatability of operations to mate the probe 106 and the drogue 114. For example, the vision processor 108 can process thermal image data generated by the thermal imaging sensor 104 to determine an estimated radius of the drogue 114, which can be used to determine a distance to the drogue 114 or a relative position of the drogue 114, without the cost and complexity of integrating other types of sensors in the first aircraft 102. Additionally, or alternatively, the estimates generated by the vision processor 108 can be used to support object recognition performed by other systems of the first aircraft 102 or in accordance with other techniques by the vision processor 108, thereby improving the reliability and increasing confidence in the tracking and ranging estimations generated by the first aircraft 102. Such highly reliable radius estimation is provided without significantly increasing the cost or complexity of the first aircraft 102, as the thermal imaging sensor 104 and the vision processor 108 represent a relatively small and low-cost portion of the overall processing resources and sensors onboard the first aircraft 102. The radius estimates may be provided to the additional processor(s) 111, such as a guidance processor, which can mimic maneuvers performed by highly skilled human operators without the time and cost required to train the operators. Further, damage caused by improper maneuvers performed by automated aircraft or spacecraft can be reduced or eliminated by performing maneuvers that are determined based on the range estimates and/or position estimates output by the vision processor 108 (or based on radius estimates output by the vision processor 108).

Figure 2:
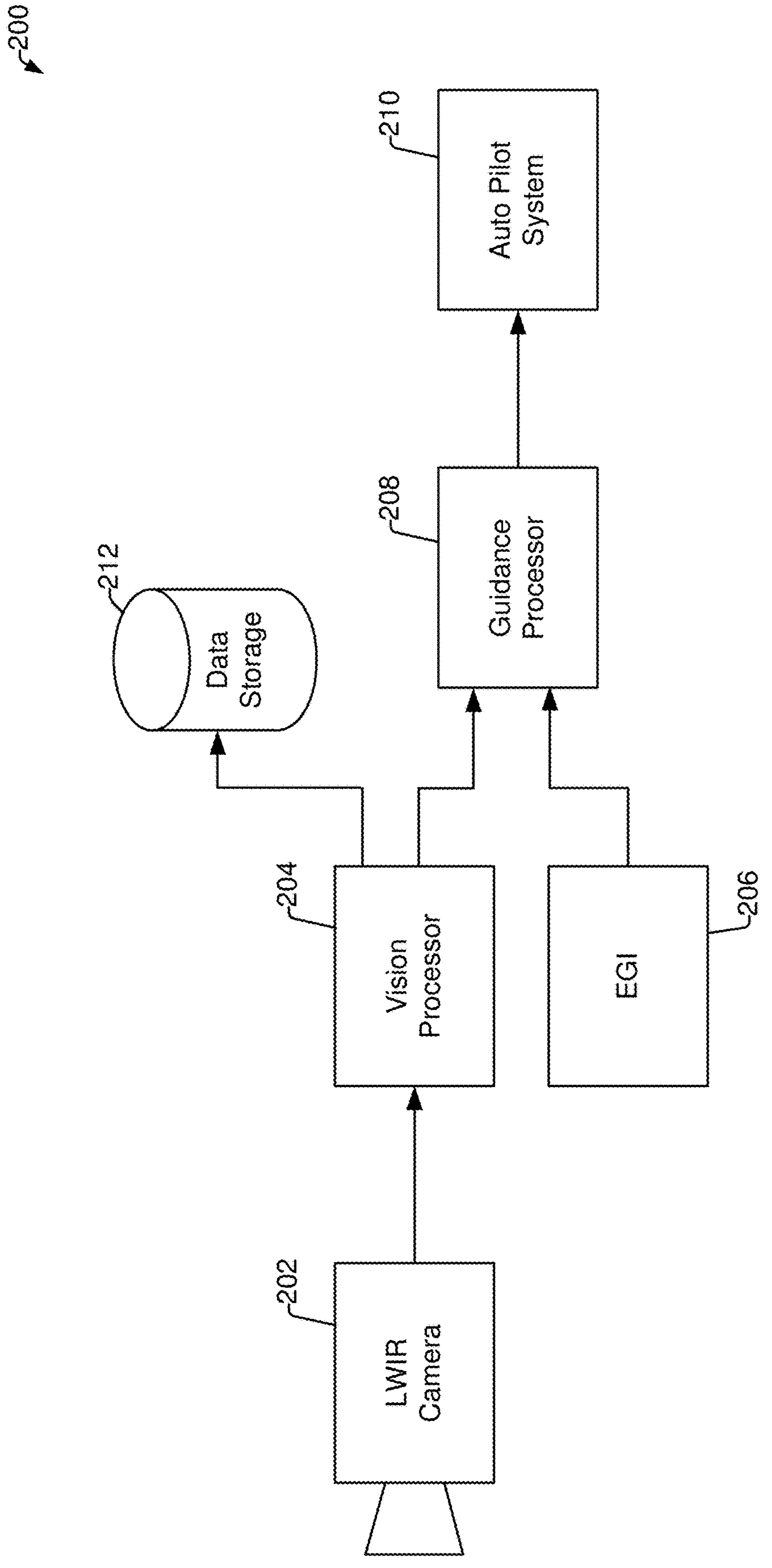
FIG. 2 is a diagram that illustrates an example of a system configured to perform thermal image-based object size estimation to mate connectors of vehicles.

FIG. 2 is a diagram that illustrates a system 200 that is configured to perform thermal image-based object size estimation to mate connectors of vehicles. The system 200 is included in one or more devices, such as an autonomous or semi-autonomous aircraft or an autonomous or semi-autonomous spacecraft. As an example, the system 200 can be included in or correspond to the first aircraft 102 of FIGS. 1A, 1D, and 1E. In the implementation shown in FIG. 2, the system 200 includes an LWIR camera 202, a vision processor 204, an optional embedded GPS-aided inertial navigation system (EGI) 206, a guidance processor 208, an auto pilot system 210, and optional data storage 212. The LWIR camera 202 is coupled to the vision processor 204, the vision processor 204 is coupled to the guidance processor 208 and the data storage 212, the EGI 206 is coupled to the guidance processor 208, and the guidance processor 208 is coupled to the vision processor 204, the EGI 206, and the auto pilot system 210. Although illustrated as being included in the system 200 in FIG. 2, in some other implementations, the EGI 206 is omitted from the system 200.

The LWIR camera 202 may include or correspond to the thermal imaging sensor 104. In some implementations, the LWIR camera 202 is configured to capture thermal images within a field of vision and to output thermal image data representing the thermal images to the vision processor 204. The thermal image data can depict temperature information of a captured scene, such as a portion of another aircraft or spacecraft that is within a particular range of the aircraft on which the system 200 is onboard, a connector (e.g., a drogue, a drogue basket, or other aerial refueling basket or structure) coupled to the aircraft, or a combination thereof. Although described as a LWIR camera, in other implementations, the LWIR camera 202 may additionally include, or be replaced with, any type of IR image capture device or thermal imaging device. Additionally, or alternatively, one or more other cameras, image capture devices, LED devices, or the like, may be similarly coupled to the vision processor 204 and configured to output respective image data or other types of data for use by the vision processor 204.

The vision processor 204 includes one or more processors, processor systems, CPUs, GPUs, DSPs, and/or other hardware or circuitry, such as FPGAs or ASICs, that are configured to process the thermal image data from the LWIR camera 202 (and optionally other data from other sensors) to identify and track another aircraft or spacecraft, or a connector coupled thereto, within a series of thermal images represented by the thermal image data. For example, the vision processor 204 can include or correspond to the vision processor 108. As described further herein with reference to FIGS. 3-4, the vision processor 204 can determine a gradient of a thermal image to identify pixels that can be processed to generate a histogram that indicates how much the pixels (e.g., points) at various radial distances from a candidate center are circularly aligned around a candidate center of a drogue or other type of basket or structure. The histogram, or scores/values represented by the histogram, can be used to estimate a radius of the drogue based on the geometry of the drogue. Additionally, in some implementations, the vision processor 204 can process the thermal imaging data and/or other data to identify, track, and/or determine the range (e.g., distance) to, or position of, another aircraft, or a connector of the other aircraft, using other techniques. In implementations in which the vision processor 204 determines multiple estimated radii, other derived values, other processed thermal image data, or a combination thereof, each such estimation or value may be associated with a confidence score generated by the vision processor 204 or that can be derived by the guidance processor 208. The vision processor 204 provides the estimates, derived values, and/or processed thermal image data, and optionally the confidence scores, to the guidance processor 208 for further processing and, optionally, to the data storage 212.

The guidance processor 208, the EGI 206, or both, may include or correspond to the additional processor(s) 111. The guidance processor 208 includes one or more processors, processor systems, CPUs, GPUs, DSPs, and/or other hardware or circuitry, such as FPGAs or ASICs, that are configured to process the output of the vision processor 204 and optional GPS and INS data received from the EGI 206 to determine one or more maneuvers to be performed by the aircraft on which the system 200 is onboard to cause the aircraft to mate a connector (e.g., the probe 106) with a connector (e.g., the drogue 114) of the other aircraft. The maneuvers can include navigation directions for the aircraft, movements for a probe or other arm or boom that controls the connector for the aircraft, engine control instructions, other maneuver-related information, or a combination thereof, that when executed by the auto pilot system 210, cause the aircraft to approach the other aircraft, maintain formation flight with the other aircraft, and/or mate the connector to the corresponding connector of the other aircraft, such as during an aerial refueling operation or a docking operation between spacecraft. As a non-limiting example, the guidance processor 208 may output instructions to the auto pilot system 210 to cause the first aircraft 102 to mate the probe 106 with the drogue 114 of the second aircraft 112.

In implementations that include the data storage 212, the vision processor 204 can be configured to provide the various output (e.g., an estimated radius, a confidence score, values associated with a radius histogram, processed thermal image data, etc.) to the data storage 212 for storage on the aircraft and/or transmission to another system or device. For example, the data storage 212 can include network or cloud storage that is wireless connected to the system 200 at various times. The output data from the vision processor 204 (the "vision output data") may be used to train one or more artificial intelligence (AI) or machine learning (ML) models to automatically perform operations associated with the vision processor 204, the guidance processor 208, or a combination thereof. To illustrate, the vision output data can be provided as training data to an autonomous agent (e.g., an AI or ML model) to train the autonomous agent to estimate a range to another aircraft based on input thermal imaging data. In a particular aspect, the image data (or features extracted therefrom) can be labeled with corresponding estimated radii, corresponding confidence scores, other intermediate values, or a combination thereof, to train the autonomous agent to estimate a radius of a drogue based on non-labeled thermal image data that depicts the drogue and that is received as input. In another aspect, the image data (or features extracted therefrom) can be labeled with one or more maneuvers output by the guidance processor 208 to train the autonomous agent to, responsive to receiving unlabeled thermal image data, output maneuver instructions to cause the aircraft to mate the connector with the connector of the other aircraft. In a particular implementation, the trained autonomous agent includes or corresponds to a neural network. As an example, the neural network of the trained autonomous agent is trained using one or more reinforcement learning techniques. To illustrate, during a training phase, the reinforcement learning techniques may train the neural network based in part on a reward that is determined by comparing a proposed maneuver output by the neural network to an optimum or target maneuver in particular circumstances. In this context, the optimum or target maneuver may include, for example, a shortest or least cost maneuver to mate the connectors of the aircrafts; a maneuver that mimics a maneuver performed by one or more skilled human operators under similar circumstances; a maneuver that satisfies a set of safety conditions, such as not causing any undesired contact between portions of the aircrafts; a maneuver that corresponds to maneuvering characteristics specified during or before training; or a combination thereof. As another example, during a training phase, the reinforcement learning techniques may train the neural network based in part on a reward that is determined by comparing an estimated radius output by the neural network to a measured radius of the drogue depicted in the thermal image data.

In some implementations, the system 200 may include a display (not shown). The display may be coupled to the LWIR camera 202, the vision processor 204, the guidance processor 208, the auto pilot system 210, or a combination thereof. The display is configured to display one or more images, a representation of one or more operations performed by the vision processor 204, one or more operations performed by guidance processor 208, one or more operations performed by the auto pilot system 210, or a combination thereof.

Figure 3:
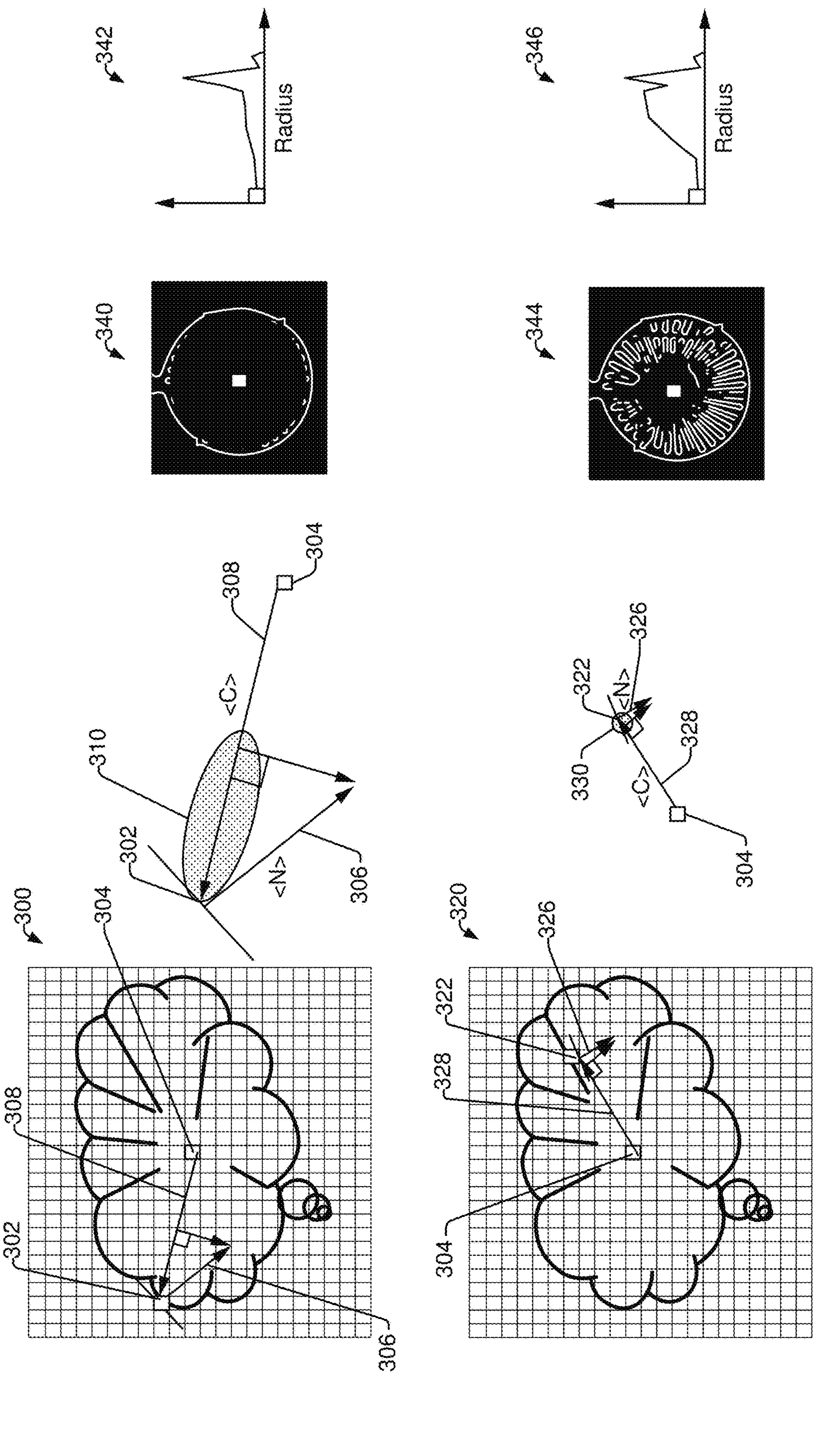
FIG. 3 depicts examples of performing thermal image-based object size estimation to mate connectors of vehicles.

FIG. 3 depicts examples of performing thermal image-based object size estimation to mate connectors of vehicles. The examples described with reference to FIG. 3 enable an autonomous aircraft or a semi-autonomous aircraft that supports an A2R2 capability, such as the first aircraft 102 of FIGS. 1A, 1D, and 1E, to extend duration of flight by performing aerial refueling by mating the probe 106 (e.g., a first connector) to the drogue 114 or other basket or structure (e.g., a second connector). In some implementations, the examples described with reference to FIG. 3 support estimation of a radius of a drogue using thermal images, and the estimated radius (or values from which the estimated radius is capable of being derived) are provided to another processor (e.g., the additional processor(s) 111 of FIG. 1A and/or the guidance processor 208 of FIG. 2) to estimate the radius and/or to use the estimated radius to determine maneuvers to be performed. Although described in the context of an aerial refueling operation with a drogue, in other implementations, the techniques described with reference to FIG. 3 can be applied to other high-precision aerial maneuvers, such as docking between two spacecraft or aircraft, or other maneuvers that involve one aircraft or spacecraft mating a connector to a substantially circular connector of another aircraft or spacecraft.

In some implementations, thermal image-based object size estimation to mate connectors of vehicles is performed by a system that includes a receiver aircraft (e.g., the first aircraft 102 of FIGS. 1A, 1D, and 1E) that is outfitted with a LWIR camera or other thermal imaging sensor (e.g., the thermal imaging sensor 104 of FIGS. 1A, 1D, and 1E or the LWIR camera 202 of FIG. 2) and a tanker aircraft (e.g., the second aircraft 112 of FIG. 1A) with an aerial refueling drogue or other basket (e.g., the drogue 114 of FIGS. 1A-1C). In implementations, the system (e.g., a vision processor on-board the receiver aircraft, such as the vision processor 108 of FIG. 1A or the vision processor 204 of FIG. 2) is configured to calculate a gradient, including a magnitude and an angle, of an LWIR image from the LWIR camera. The system is also configured to obtain an initial candidate (e.g., proposed or estimated) center of the drogue. The candidate center may be obtained by the vision processor performing a different type of object recognition and/or tracking operation on thermal images from the LWIR camera or by receiving the candidate center from another source. Because the candidate source can be determined by another process, which can be a more coarse estimation process, the thermal image-based object size estimation described herein can provide a more high-precision estimated radius and/or range to the drogue, which can be used to increase confidence that a given object identified in the thermal images is actually the drogue and not some other circular object detected by the system.

To perform thermal image-based object size estimation, the vision processor processes a thermal image that depicts the drogue having the candidate center that is obtained as described above to construct a histogram that indicates a relative amount that points at each given radial distance from the candidate center of the drogue are aligned around the candidate center. To illustrate, the vision processor can generate a gradient representation of the thermal image, such as an intensity gradient image in which each pixel represents an intensity of a gradient in the corresponding thermal image. In some implementations, the intensity gradient image is thresholded such that pixels having intensity values that fail to satisfy (e.g., are less than or are less than or equal to) a threshold are omitted from the intensity gradient image. After generating the intensity gradient image, the vision processor iterates over a region of interest centered at the candidate center (e.g., a region larger than the drogue where the drogue is expected to be depicted) and, for each sampled point (e.g., pixel), the vision processor calculates a radial distance from the sampled point to the candidate center and an angle of the gradient at the sampled point. To illustrate, the vision processor can process the thermal image to determine a gradient intensity (e.g., a change in intensity values between adjacent pixels) and a gradient direction (e.g., a direction of the largest intensity change between a pixel and up to eight adjacent pixels in examples in which pixels are arranged in rows and columns) for each of one or more sampled points (e.g., pixels). To further illustrate, separate x and y gradients can be calculated for each pixel in order to constitute a gradient vector in lieu of explicitly calculating the magnitude and direction of the gradient at the pixel. As an illustrative example, if the intensity gradient image depicts a circle, a direction of the gradient at a point on the circle is perpendicular to (e.g., normal to) a tangent to the circle at the point, as the greatest change in intensity is from a high intensity value (e.g., the edge of the circle) to a low intensity value (e.g., a low-intensity pixel adjacent to the circle). As gradients can be used in edge detection in images, the gradient direction is the same direction as an "edge normal", which is a unit vector in the direction of maximum intensity change, and is perpendicular to an "edge direction", which is a unit vector along an edge.

While iterating over the region of interest, the vision processor generates the histogram by adding, to the bin (e.g., entry) for the calculated radial distance, a score that is based on the alignment of the gradient direction (e.g., the edge normal) with a vector from the candidate center to the sampled point (e.g., a radial vector). For example, for a sampled point at a radial distance R1 from the candidate center, the vision processor can determine a score that represents how much (e.g., a relative amount) the gradient direction of the sampled point is aligned with a vector from the candidate center to the sampled point. The score can be generated by projecting the edge normal vector for the sampled point onto the radial vector through the sampled point and weighting the value. The score is added to a bin (e.g., entry) in the histogram that corresponds to the radial distance R1, and the vision processor can repeat this process for one or more other sampled points. In this manner, the histogram stores entries for one or more radial distances that represent how strongly the sampled points at the corresponding radial distance represent edges that are circularly aligned around the candidate center. Stated another way, the histogram is a radial histogram of edge orientation with respect to the candidate drogue center.

To illustrate creation of such a histogram, FIG. 3 depicts a first example 300 and a second example 320 of one or more operations of the above-described process that are applied to a thermal image of a drogue or other type of basket or structure. Prior to the operations described with reference to the examples 300, 320, the thermal image is processed to produce an intensity gradient image that is optionally thresholded, as well as to produce gradient directions, or vectors (e.g., x and y vectors of the gradient), for each of the pixels in the intensity gradient image. In some implementations, the histogram creation process is performed according to the following algorithm:

| Radial Histogram Algorithm |
|---|
| Given a candidate center (C),<br>For each point/pixel (P):<br>Determine edge normal$\langle N \rangle$ (e.g., based on gradient direction);<br>Determine radial distance (R) = $\sqrt{(C - P)^2}$;<br>Determine vector to center$\langle C \rangle$ = $(C \rightarrow P)$;<br>Accumulate, in histogram in bin R, $\langle N \rangle \cdot \langle C \rangle * 1000$. |

In the first example 300, for a first point 302 (e.g., a pixel in the intensity gradient image) and a candidate center 304, a first normal vector 306 (e.g., a first edge normal) is determined as a unit vector in the gradient direction (or 180° from the gradient direction) at the first point 302. As described above, the gradient direction is determined based on a direction in which pixel intensity has the highest change from the first point 302 to any adjacent pixel. After determining the first normal vector 306, a first radial distance R1 is determined as the distance between the first point 302 and the candidate center 304, and a first vector 308 (e.g., a first radial vector) is formed from the candidate center 304 to the first point 302. The first normal vector 306 is projected onto the first vector 308 to generate a first projection 310 (the encircled portion of the first vector 308 in FIG. 3), and the first projection 310 is multiplied by a fixed scale factor to generate an alignment score for the first point 302. The alignment score for the first point 302 is then added to a bin (e.g., an entry) of the histogram that corresponds to the first radial distance R1 associated with the first point 302. In the example shown in FIG. 3, the fixed scaling factor is 1000, but in other implementations, the fixed scaling factor can be some other value. Because other similar alignment scores will be accumulated from other points/pixels that are the same radial distance R1 from the candidate center 304, the entry in the histogram that corresponds to R1 represents a weighted accumulation of the projection of the edge normal along the radial vector at each point in the intensity gradient image that is a distance R1 from the candidate center 304.

As such, points that are on the edge of the substantially circular drogue, even in orientations in which the drogue is skewed or otherwise not perfectly circular, will be heavily weighted such that the histogram has higher values in bins that correspond to points along the edge of the drogue, as these points are associated with edge normal vectors that are more aligned with the respective radial vectors than other points, such as points along spokes of the drogue or other non-edge points.

After processing the first point 302 described with reference to the first example 300, other points (e.g., pixels) in the intensity gradient image are similarly processed to accumulate values in the bins of the histogram. The points in the intensity gradient image can be processed in any order, such as top-down and left-to-right or in circles of increasing radial distance from the candidate center 304, until all points (e.g., all pixels having an intensity that satisfies a threshold) within the region of interest are processed and corresponding scores are added to the histogram. As another example of this process, in the second example 320, for a second point 322 and the candidate center 304, a second normal vector 326 (e.g., a second edge normal) is determined as a unit vector in the gradient direction (or 180° from the gradient direction) at the second point 322. After determining the second normal vector 326, a second radial distance R2 is determined as the distance between the second point 322 and the candidate center 304, and a second vector 328 (e.g., a second radial vector) is formed from the candidate center 304 to the second point 322. The second normal vector 326 is projected onto the second vector 328 to generate a second projection 330 (the encircled portion of the second vector 328 in FIG. 3), and the second projection 330 is multiplied by the fixed scale factor (e.g., 1000 or some other scale factor) to generate a second alignment score for the second point 322. The second alignment score is then added to a bin of the histogram that corresponds to the second radial distance R2 associated with the second point 322. Because the second point 322 in the second example 320 is along a spoke of the drogue, the second normal vector 326 is less aligned with the second vector 328 than the first normal vector 306 is aligned with the first vector 308, and thus the second alignment score calculated from the second point 322 and added to the histogram in the bin corresponding to R2 is less than the first alignment score calculated from the first point 302 and added to the bin corresponding to R1.

FIG. 3 also includes a first intensity gradient image 340 and a first histogram 342 that is created from the first intensity gradient image 340, in addition to a second intensity gradient image 344 and a second histogram 346 that is created from the second intensity gradient image 344. Filtering the gradient image in accordance with the radial histogram algorithm described above can result in the first intensity gradient image 340 in which pixels having a high intensity value (e.g., due to having proportionally high alignment between corresponding edge normal vectors and corresponding radial vectors) are located around the edge of the drogue and other pixels are substantially filtered out (e.g., due to having proportionally low alignment between corresponding edge normal vectors and corresponding radial vectors). Because pixels corresponding to edges that are not located around the outside edge of the drogue have been filtered out, such as pixels along spokes of the drogue, the first histogram 342 includes a single spike centered on a radial distance from the candidate center to the edge of the drogue. However, in a second example in which this filtering is not applied, the second intensity gradient image 344 includes pixels having a high intensity value that are located on spokes of the drogue in addition to pixels having a high intensity value that are located around the outside edge of the drogue. Because the spoke pixels are not filtered according to the radial histogram algorithm, the second histogram 346 includes multiple smaller spikes and/or plateaus in addition to a spike that is centered on a radial distance from the candidate center to the outside edge of the drogue, which can increase the difficulty in estimating a radius of the drogue depicted in the second intensity gradient image 344. Although these examples are simplified for explanation, it can be appreciated that a radial histogram constructed in such a manner can provide information that can be used to estimate a radius of a drogue depicted in an intensity gradient image generated from a thermal image.

Returning to the above-described thermal image-based object size estimation process, after creating the histogram, one or more peaks of the histogram are scored using various metrics to determine a respective score that represents whether the peak corresponds to an actual aerial refueling basket (e.g., the drogue or other basket or structure). In some implementations, the score for each peak is a confidence score that the respective peak corresponds to points in the intensity gradient image that are located along the outside edge of the drogue at a corresponding radial distance. Using the score(s), an interpolated and refined estimate of the basket radius (e.g., the drogue radius) is determined based on the histogram. The estimated radius can be used to refine an estimated range to the drogue and/or serve as state-based feedback for processing of a next frame of thermal image data in tracking the drogue and/or a tanker aircraft or spacecraft to which the drogue is coupled. As such, the thermal image-based object size estimation process uses the histogram to estimate the radius of the drogue or to generate a score that indicates a confidence (e.g., a probability) that the candidate center is actually the center of the drogue. The estimated radius and/or score, or intermediate values or scores from which the estimated radius and/or the score can be derived, can be provided to another processor (e.g., a guidance processor) for additional processing if needed and to be leveraged to generate maneuvers for an automated or semi-automated aircraft.

FIG. 4 depicts examples of histograms and values derived therefrom that support thermal image-based object size estimation to mate connectors of vehicles. FIG. 4 includes a histogram 400 and a set of histograms 408 that are generated based on thermal images, as described above with reference to FIG. 3. In an example, the set of histograms 408 includes eight histograms labeled A1-A4 and B1-B4, that are each generated from one of eight different false candidate drogue centers (e.g., candidate centers that do not represent the actual center of a drogue or other basket or structure) considered from a thermal image. In an example, the histogram 400 is characteristic of a true drogue center (e.g., a candidate center that represents the actual center of the drogue) from the thermal image. The histograms 400 and 408 can be numerically processed against one or more scoring metrics 404 that capture the difference between the shape of the true and false histograms. The scoring metrics 404 included in the table in FIG. 4 are also illustrated with respect to the histogram 400 in FIG. 4. In an example, the scores for the histograms 400, 408 are tabulated in table 402 and can be combined to indicate a radius of a drogue depicted in the corresponding thermal image and/or indicate a confidence that a candidate center is correct. In some implementations, the score(s) are output as a third stage of a drogue identification and tracking process that includes a camera calibration stage, a first pass drogue scoring stage, and a second pass drogue scoring stage. The camera calibration stage includes lens de-centering operation(s), lens spherical distortion operation(s), lens field of view operation (s), other calibration operation(s), or a combination thereof. The first pass drogue scoring stage includes determining blob scoring weights, such as weights, counts, radii, asymmetry scores, densities, decenters, or a combination thereof, and the second pass drogue scoring stage includes determining the scores shown in the table 402.

In some implementations, the scores generated based on the histograms 400 and 408 (e.g., during the second pass drogue scoring stage) can also be referred to as radius histogram weights or radius histogram scores and include an in/out ratio, a full width at half maximum height (FWHM), a peak radius, a signal to mean ratio (SMR), a radius difference between the peak radius and a secondary peak radius, a height difference between the peak radius and the secondary peak radius, other scores, or a combination thereof. The in/out ratio is, for a given peak radius, the ratio of a sum of the values in bins associated with lower values than the peak radius (e.g., representing points inside the drogue) to a sum of values in bins associated with higher values than the peak radius. To illustrate, the histogram 400 illustrates a peak ("rPeak"), and an in/out ratio ("dInOut") which is a ratio of the mean values on the left and right of the main peak ("rPeak").

The histogram 400 also depicts others of the scores. The peak radius ("rPeak") represents the radius of the largest group of pixels having gradient directions that are strongly aligned with radial vectors (e.g., that point to a candidate center), as indicated by a highest accumulated value in the histogram 400 (e.g., a highest peak), and a secondary peak ("2ndPk") represents the radius of the second largest group of pixels having gradient directions that are strongly aligned with radial vectors (e.g., that point to a candidate center), as indicated by a second-highest accumulated value in the histogram 400. The FWHM represents the width between a first radius value and a second radius value that are on opposite sides of the peak radius and that have accumulated values that are half the accumulated value at the peak radius. In some implementations, the peak radius, the FWHM, and/or the secondary peak radius are determined based on quadratic interpolation of multiple accumulated values of the histogram 400. As an illustrative example, FIG. 4 depicts a histogram portion 406 that includes three of the highest accumulated values of an illustrative histogram. In this example, the peak radius and FWHM can be determined using quadratic interpolation to generate a quadratic curve that fits the accumulated values of the histogram portion 406. A peak radius calculated in this manner can be between values of bins of the histogram and/or have a height that is different than the accumulated values, and the FWHM can be between values of bins of the histogram. Alternatively, any between-bin values or between-accumulated values may be rounded to the nearest bin or accumulated value.

Returning to the histogram 400, a mean value ("Mean") represents the mean value of all radii (e.g., the mean accumulated value for all of the radius bins, which represents an approximate noise floor). The SMR ("SMR") represents a ratio of the peak radius to the mean value, such as a difference in a height of the peak radius ("PkHgt") and the mean value. The radius difference ("2ndPk") between the peak radius and a secondary peak radius (e.g., a radius of a secondary peak) represents a difference between the peak radius and the secondary peak radius. The height difference ("dPk") between the peak radius and a secondary peak radius represents a difference between the height of the peak radius (PkHgt) and the height of the secondary peak radius (e.g., a ratio of the accumulated value associated with the peak radius to the accumulated value associated with the secondary peak radius). A drogue to probe temperature difference ("dT") represents a difference between the temperature of the drogue (as indicated by the mean intensity of pixels within the expected radius of the candidate center in the thermal image) and a reference temperature calculated from the thermal image of the probe of the aircraft or spacecraft, or an outside air temperature probe.

Any or all of the above-described scores can be output by the vision processor (e.g., the vision processor 108 of FIG. 1A or the vision processor 204 of FIG. 2) to another processor to enable determination of an estimated radius of the drogue in the thermal image that is centered at the candidate center. Alternatively, the vision processor can generate the estimated radius and/or a confidence score that is provided to the other processor. In some implementations, the vision processor compares the scores generated based on the histogram to one or more thresholds, and if the score(s) satisfy the threshold(s), the vision processor accepts the candidate center as an estimated center that is provided to the other processor. However, if the score(s) fail to satisfy the threshold(s), the vision processor sets a flag or generates an output indicating that the candidate center is not accepted, which can trigger performance of another object identification processing using thermal images to generate another candidate center.

Figure 5:
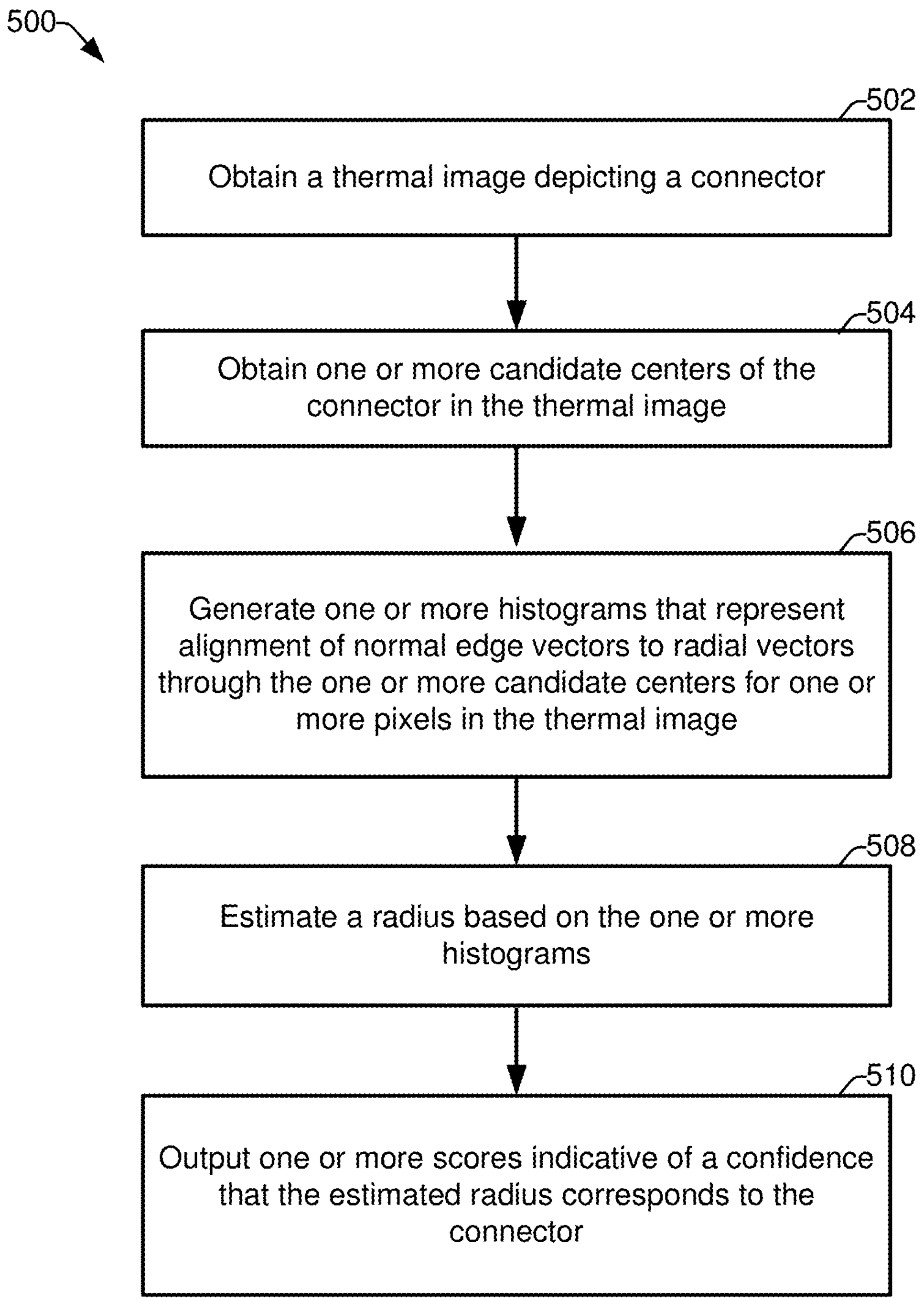
FIG. 5 is a diagram that illustrates a flow chart of an example of a method of performing thermal image-based object size estimation to mate connectors of vehicles.

FIG. 5 is a flowchart that illustrates an example of a method 500 of performing thermal image-based object size estimation to mate connectors of vehicles according to one or more aspects of the present disclosure. The method 500 can be initiated, performed, or controlled by one or more processors executing instructions, or by circuitry configured to cause performance of one or more operations, such as resides within the vision processor 108 of FIG. 1A, the vision processor 204 of FIG. 2, or a combination thereof.

In some implementations, the method 500 includes, at block 502, obtaining, via a thermal imaging sensor, a thermal image depicting a connector. For example, the thermal imaging sensor 104 of FIGS. 1A, 1D, and 1E or the LWIR camera 202 of FIG. 2 can generate thermal image data depicting the drogue 114 trailing behind the second aircraft 112 of FIG. 1A, which can be received by the vision processor 108 of FIG. 1A or the vision processor 204 of FIG. 2. The method 500 also includes, at block 504, obtaining one or more candidate centers of the connector in the thermal image. For example, the vision processor 108 of FIG. 1A or the vision processor 204 of FIG. 2 can obtain candidate centers, such as the candidate center 304 of FIG. 3.

The method 500 includes, at block 506, generating one or more histograms that represent alignment of normal edge vectors to radial vectors through the one or more candidate centers for one or more pixels in the thermal image. For example, the vision processor 108 of FIG. 1A or the vision processor 204 of FIG. 2 can generate histogram(s) based on normal edge vectors (e.g., unit vectors parallel to the gradient direction) and radial vectors in an intensity gradient image, such as the histograms 400 and 408 of FIG. 4. The method 500 includes, at block 508, estimating a radius based on the one or more histograms. For example, the vision processor 108 of FIG. 1A or the vision processor 204 of FIG. 2 may estimate a radius based on radius histogram scores, such as described with reference to FIG. 4. The method 500 includes, at block 510, outputting one or more scores indicative of a confidence that the estimated radius corresponds to the connector. For example, the vision processor 108 of FIG. 1A or the vision processor 204 of FIG. 2 can output one or more confidence scores, an estimated radius, or both, based on a histogram, such as described with reference to FIGS. 3-4.

In some implementations, the method 500 can include more, fewer, and/or different steps without departing from the scope of the subject disclosure. For example, the method 500 can also include, to generate a histogram of the one or more histograms for a candidate center of the one or more candidate centers and for each pixel of a first set of pixels that are a first distance from the candidate center, generating a normal edge vector through the pixel in a same direction as a gradient direction associated with the pixel, generating a radial vector from the candidate center to the pixel, generating an alignment score associated with the pixel based a projection of the normal edge vector onto the radial vector, and adding the alignment score to an entry in the histogram associated with the first distance. For example, the normal edge vector may include or correspond to the first normal vector 306 of FIG. 3, the radial vector may include or correspond to the first vector 308 of FIG. 3, and the entry may include or correspond to one of the bins of the histogram 400 of FIG. 4. In some such implementations, the gradient direction of the pixel corresponds to a direction in which pixel intensity has the highest change from the pixel to any adjacent pixel, as described above with reference to FIG. 3. Additionally, or alternatively, the method 500 can further include determining one or more radius histogram scores based on the histogram, with the one or more radius histogram scores including an in/out ratio, a FWHM, a peak height, a SMR, a radius difference between a peak and a secondary peak, a height difference between the peak and the secondary peak, or a combination thereof. In some such implementations, the method 500 can also include, based on the one or more radius histogram scores satisfying one or more thresholds, scoring one of the one or more candidate centers as correctly estimating an actual center of the connector.

In some implementations, the method 500 can further include generating an intensity gradient image based on the thermal image. The one or more histograms are generated based on the intensity gradient image. In some such implementations, the method 500 can also include thresholding the thermal image to generate a thresholded thermal image that includes pixels associated with intensities that satisfy a threshold.

In some implementations, the connector (e.g., a drogue basket) trails behind at least a portion of the vehicle in the thermal image. Additionally, or alternatively, the thermal imaging sensor and the vision processor can be integrated in an autonomous aircraft or a semi-autonomous aircraft, such as the first aircraft 102 of FIGS. 1A, 1D, and 1E. Additionally, or alternatively, generating the one or more histograms may include, while iterating through pixels in a region of interest, generating an alignment score associated with the pixel and adding the alignment score to an entry in the one or more histograms associated with a distance between the pixel and one of the one or more candidate centers.

The method described above with reference to FIG. 5 can be implemented to realize one or more of the technical advantages described in more detail above. For example, the method 500 can improve efficiency (e.g., by reducing training costs), reliability, and repeatability of operations to mate connectors between two vehicles (e.g., two autonomous or semi-autonomous vehicles). For example, processing thermal image data to determine an estimated radius of a connector (e.g., the drogue 114 of FIGS. 1A-1C), or radius histogram scores that can be used to estimate the radius, can avoid the cost and complexity of integrating other types of sensors such as GPS-based or INS-based systems. Additionally, or alternatively, the estimated radius can be used in combination with such systems to provide improved reliability and confidence in estimates generated by the systems. Such highly reliable estimates and/or scores are provided without significantly increasing the cost or complexity of the vehicle due to the relatively low cost and complexity of hardware to support the thermal imaging sensing operations and the vision processing operations of the method 500. The estimates generated by the method 500 may be provided to additional processor(s), such as a guidance processor, that can mimic maneuvers performed by highly skilled human operators without the time and cost required to train the operators. The method 500 also provides a real-time refinement of an estimated connector radius at a sub-pixel level, which can allow for significantly improved ranging performance when using a single camera to calculate the range to the connector (e.g., based on the estimated radius).

Figure 6:
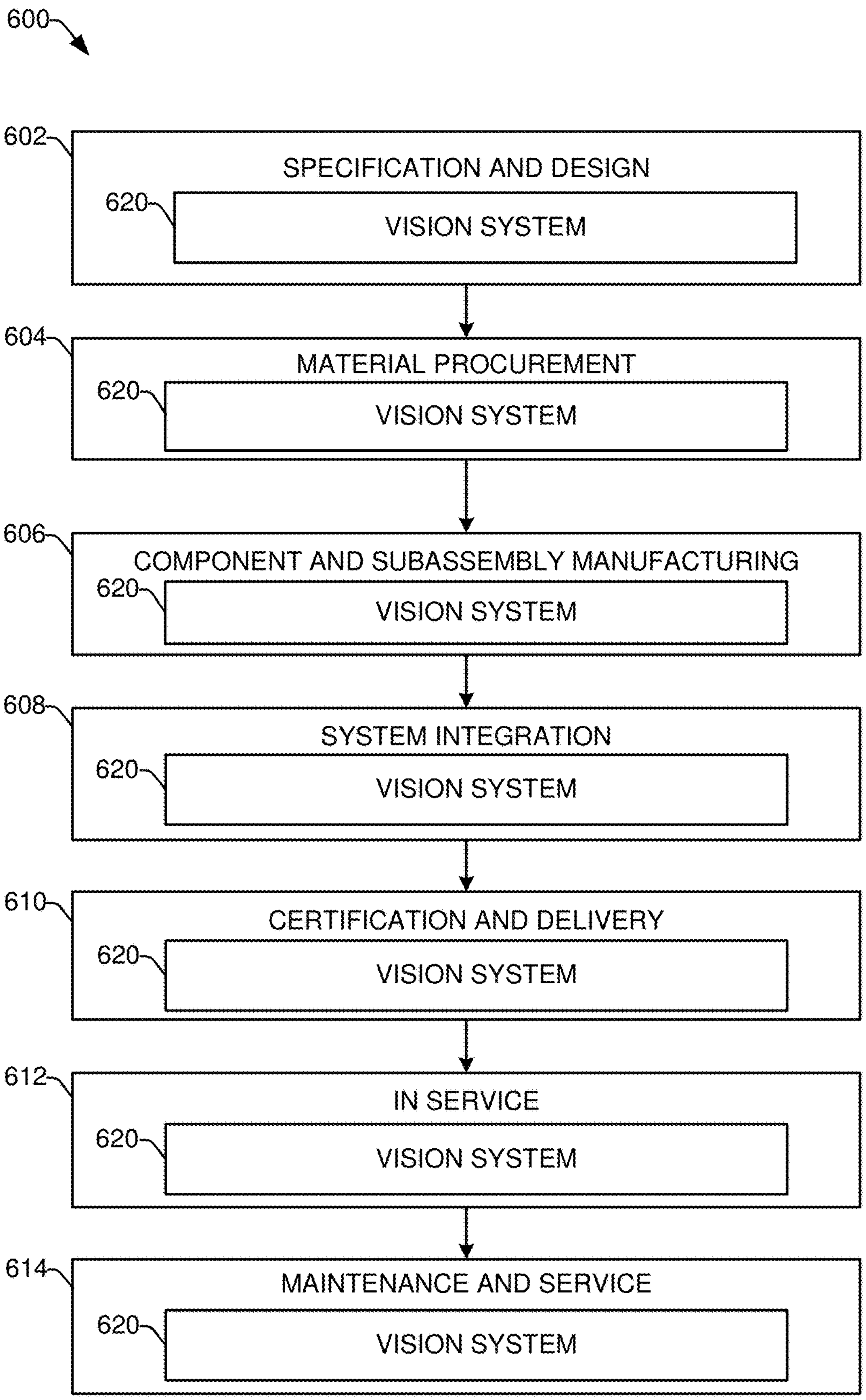
FIG. 6 is a flowchart illustrating an example of a life cycle of an aircraft including a vision system configured to perform thermal image-based object size estimation to mate connectors of vehicles.

Referring to FIG. 6, a flowchart illustrative of an example of a life cycle of an aircraft that includes a vision system configured to perform thermal image-based object size estimation to mate connectors of vehicles is shown and designated 600. During pre-production, the exemplary method 600 includes, at 602, specification and design of an aircraft, such as the first aircraft 102 described with reference to FIGS. 1A, 1D, and 1E. During specification and design of the aircraft, the method 600 can include specification and design of a vision system 620 that is configured to perform thermal image-based object size estimation to mate connectors of vehicles. The vision system 620 may include one or more components of the system 100 of FIGS. 1A-1E (e.g., the thermal imaging sensor 104, the vision processor 108, and/or the one or more additional processor(s) 111) or the system 200 of FIG. 2. At 604, the method 600 includes material procurement, which can include procuring materials for the vision system 620.

During production, the method 600 includes, at 606, component and subassembly manufacturing and, at 608, system integration of the aircraft. For example, the method 600 can include component and subassembly manufacturing of the vision system 620 and system integration of the vision system 620. At 610, the method 600 includes certification and delivery of the aircraft and, at 612, placing the aircraft in service. Certification and delivery can include certification of the vision system 620 to place the vision system 620 in service. While in service by a customer, the aircraft can be scheduled for routine maintenance and service (which can also include modification, reconfiguration, refurbishment, and so on). At 614, the method 600 includes performing maintenance and service on the aircraft, which can include performing maintenance and service on the vision system 620.

Each of the processes of the method 600 can be performed or carried out by a system integrator, a third party, and/or an operator (e.g., a customer). For the purposes of this description, a system integrator can include without limitation any number of aircraft manufacturers and major-system subcontractors; a third party can include without limitation any number of venders, subcontractors, and suppliers; and an operator can be an airline, leasing company, military entity, service organization, and so on.

Figure 7:
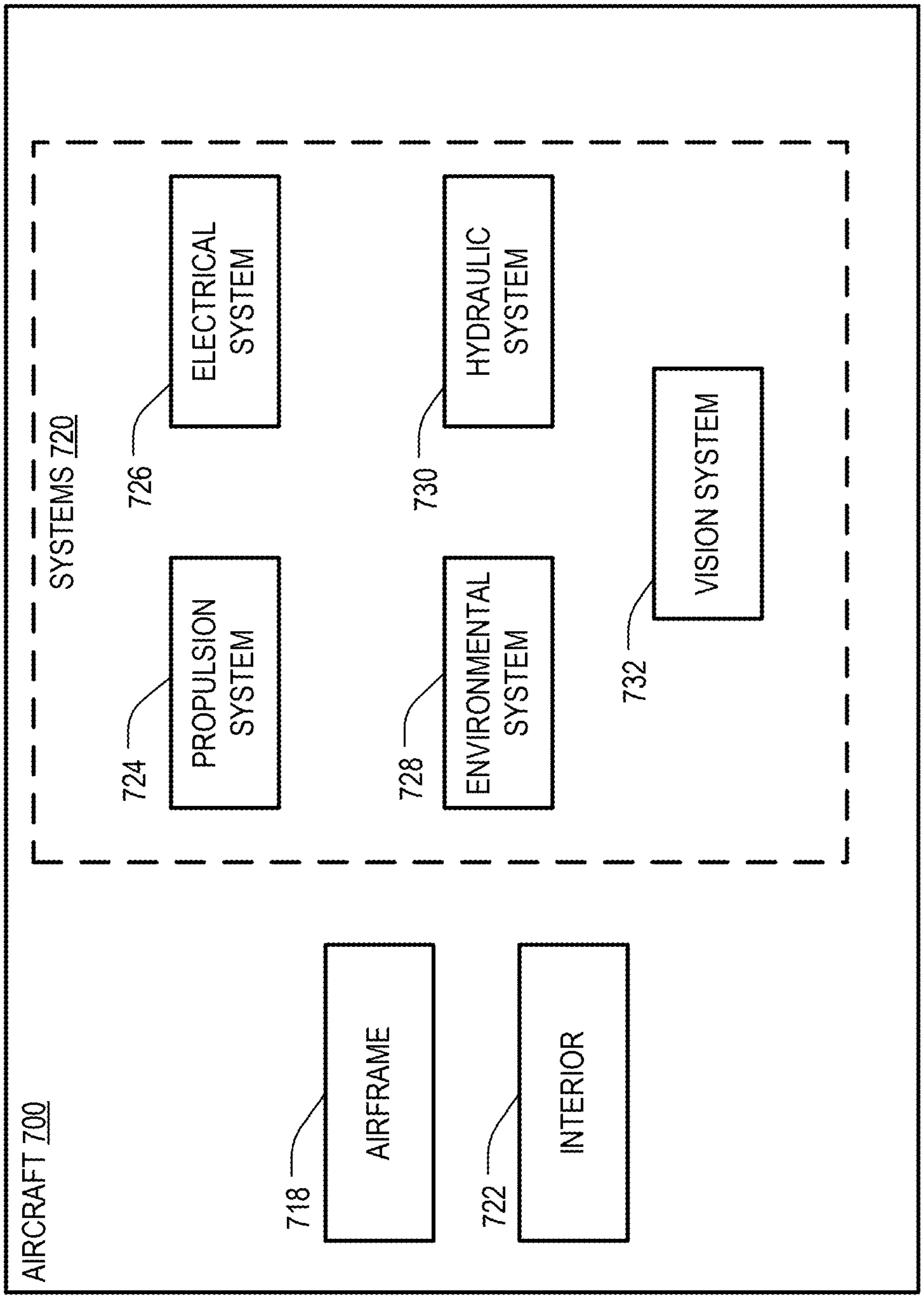
FIG. 7 is a block diagram of a particular implementation of the aircraft associated with the life cycle of FIG. 6.

Aspects of the disclosure can be described in the context of an example of a vehicle. A particular example of a vehicle is an aircraft 700 as shown in FIG. 7. The aircraft 700 can be a drone aircraft or any type of autonomous or semi-autonomous aircraft or spacecraft. In the example of FIG. 7, the aircraft 700 includes an airframe 718 with a plurality of systems 720 and an interior 722. Examples of the plurality of systems 720 include one or more of a propulsion system 724, an electrical system 726, an environmental system 728, a hydraulic system 730, and a vision system 732. Any number of other systems can be included and/or one or more of the systems depicted in FIG. 7 may be omitted. In the example of FIG. 7, the vision system 732 is configured to provide thermal image-based object size estimation functionality to mate connectors of vehicles and can include or correspond to the system 100 of FIGS. 1A-1E, the system 200 of FIG. 2, the vision system 620 of FIG. 6, or any combination thereof.

Figure 8:
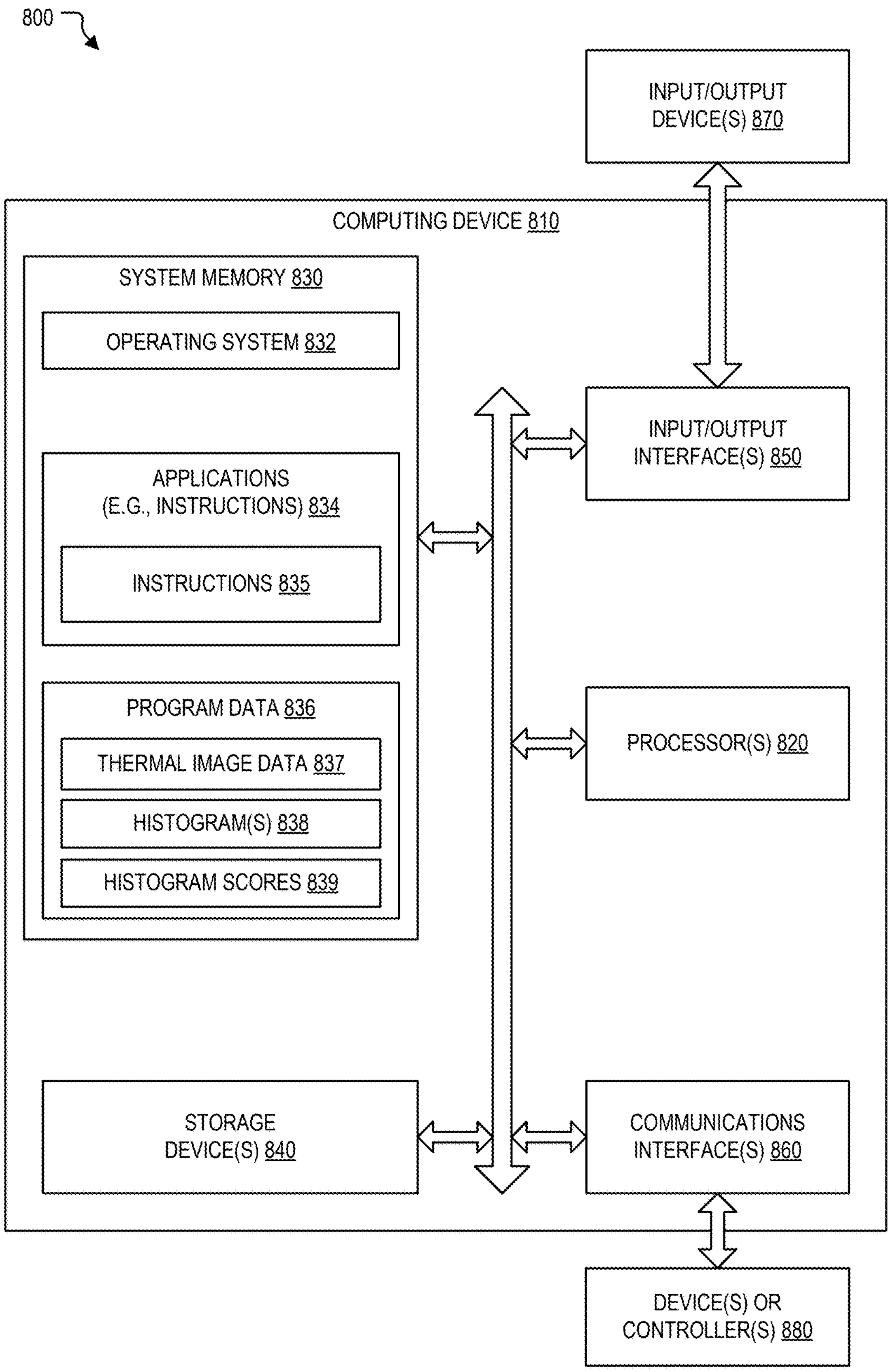
FIG. 8 is a block diagram of a computing environment including a computing device configured to support aspects of computer-implemented methods and computer-executable program instructions (or code) according to the present disclosure.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1A-1E and 2-7.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which can include a basic input/output system for booting the computing device 810 as well as a full operating system to enable the computing device 810 to interact with users, other programs, and other devices. The system memory 830 stores system (program) data 836, such as thermal image data 837, one or more histogram(s) 838, histogram scores 839, or a combination thereof. The thermal image data 837 can include or correspond to thermal image data generated by the thermal image sensor 104 of FIGS. 1A, 1D, and 1E or the LWIR camera 202 of FIG. 2. The histogram(s) 838 can include or correspond to one or more histograms generated by the vision processor 108 of FIG. 1A or the vision processor 204 of FIG. 2, such as the histograms 400 of FIG. 4. The histogram scores 839 can include or correspond to one or more radius histogram scores output by the vision processor 108 of FIG. 1A or the vision processor 204 of FIG. 2 and capable of being used to estimate a radius of a connector (e.g., a drogue or other basket or structure), such as one or more radius histogram scores described with reference to FIG. 4.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1A-1E and 2-8. To illustrate, the one or more applications 834 include instructions 835 executable by the processor(s) 820 to initiate, control, or perform one or more operations described with reference to the vision processor 108 of FIG. 1A, the vision processor 204 of FIG. 2, or a combination thereof.

In a particular implementation, the system memory 830 includes a non-transitory, computer readable medium storing the instructions 835 that, when executed by the processor(s) 820, cause the processor(s) 820 to initiate, perform, or control operations to perform thermal image-based object size estimation functionality to mate connectors of vehicles. The operations include obtaining one or more candidate centers of a connector depicted in a thermal image. The connector is attached to an aircraft. The operations also include generating one or more histograms that represent alignment of normal edge vectors to radial vectors through the one or more candidate centers for one or more pixels in the thermal image. The operations include estimating a radius based on the one or more histograms. The operations further include outputting one or more scores indicative of a confidence that the estimated radius corresponds to the connector.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the system program data 836). In a particular aspect, the system memory 830, the storage devices 840, or both, include tangible computer-readable media. In a particular aspect, one or more of the storage devices 840 are external to the computing device 810.

The one or more input/output interfaces 850 enable the computing device 810 to communicate with one or more input/output devices 870 to facilitate user interaction. For example, the one or more input/output interfaces 850 can include a display interface, an input interface, or both. For example, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 870 includes one or more user interface devices and displays, including some combination of buttons, keyboards, pointing devices, displays, speakers, microphones, touch screens, and other devices.

The processor(s) 820 are configured to communicate with devices or controllers 880 via the one or more communications interfaces 860. For example, the one or more communications interfaces 860 can include a network interface. The devices or controllers 880 can include, for example, a controller for the probe 106, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions can be executable to implement one or more of the operations or methods of FIGS. 1A-1E and 2-8. In some implementations, part or all of one or more of the operations or methods of FIGS. 1A-1E and 2-8 can be implemented by one or more processors (e.g., one or more central processing units (CPUs), one or more graphics processing units (GPUs), one or more digital signal processors (DSPs), one or more field-programmable gate arrays (FPGAs), or one or more application-specific integrated circuits (ASICs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Aspects of the disclosure are described further with reference to the following set of interrelated examples:

According to Example 1, a device includes a thermal imaging sensor and a vision processor coupled to the thermal imaging sensor. The thermal imaging sensor is configured to generate a thermal image depicting a connector. The vision processor is configured to: obtain one or more candidate centers of the connector in the thermal image; generate one or more histograms that represent alignment of normal edge vectors to radial vectors through the one or more candidate centers for one or more pixels in the thermal image; estimate a radius based on the one or more histograms; and output one or more scores indicative of a confidence that the estimated radius corresponds to the connector.

Example 2 includes the device of Example 1, wherein, to generate a histogram of the one or more histograms for a candidate center of the one or more candidate centers, the vision processor is further configured to, for each pixel of a first set of pixels that are a first distance from the candidate center: generate a normal edge vector through the pixel in a same direction as a gradient direction associated with the pixel; generate a radial vector from the candidate center to the pixel; generate an alignment score associated with the pixel based a projection of the normal edge vector onto the radial vector; and add the alignment score to an entry in the histogram associated with the first distance.

Example 3 includes the device of Example 2, wherein the gradient direction of the pixel corresponds to a direction in which pixel intensity has the highest change from the pixel to any adjacent pixel.

Example 4 includes the device of Example 2 or Example 3, wherein the vision processor is further configured to determine one or more radius histogram scores based on the histogram, wherein the one or more radius histogram scores include an in/out ratio, a full width at maximum height (FWHM), a peak height, a signal to mean ratio (SMR), a radius difference between a peak and a secondary peak, a height difference between the peak and the secondary peak, or a combination thereof.

Example 5 includes the device of Example 4, wherein the vision processor is further configured to, based on the one or more radius histogram scores satisfying one or more thresholds, score one of the one or more candidate centers as correctly estimating an actual center of the connector.

Example 6 includes the device of any of Examples 1 to 5, wherein the vision processor is further configured to generate an intensity gradient image based on the thermal image, and wherein the one or more histograms are generated based on the intensity gradient image.

Example 7 includes the device of Example 6, wherein the vision processor is further configured to: threshold the thermal image to generate a thresholded thermal image that includes pixels associated with intensities that satisfy a threshold.

Example 8 includes the device of any of Examples 1 to 7, wherein the connector trails behind at least a portion of a vehicle in the thermal image.

Example 9 includes the device of any of Examples 1 to 8, wherein, to generate the one or more histograms, the vision processor is configured to, while iterating through pixels in a region of interest: generate an alignment score associated with the pixel; and add the alignment score to an entry in the one or more histograms associated with a distance between the pixel and one of the one or more candidate centers.

Example 10 includes the device of any of Examples 1 to 9, wherein the thermal imaging sensor and the vision processor are integrated in an autonomous aircraft or a semi-autonomous aircraft.

According to Example 11, a method includes: obtaining, via a thermal imaging sensor, a thermal image depicting a connector; obtaining, by one or more processors, one or more candidate centers of the connector in the thermal image; generating, by the one or more processors, one or more histograms that represent alignment of normal edge vectors to radial vectors through the one or more candidate centers for one or more pixels in the thermal image; estimating, by the one or more processors, a radius based on the one or more histograms; and outputting, by the one or more processors, one or more scores indicative of a confidence that the estimated radius corresponds to the connector.

Example 12 includes the method of Example 11, wherein generating a histogram of the one or more histograms for a candidate center of the one or more candidate centers includes, for each pixel of a first set of pixels that are a first distance from the candidate center: generating, by the one or more processors, a normal edge vector through the pixel in a same direction as a gradient direction associated with the pixel; generating, by the one or more processors, a radial vector from the candidate center to the pixel; generating, by the one or more processors, an alignment score associated with the pixel based a projection of the normal edge vector onto the radial vector; and adding, by the one or more processors, the alignment score to an entry in the histogram associated with the first distance.

Example 13 includes the method of Example 12, further including: determining, by the one or more processors, one or more radius histogram scores based on the histogram, wherein the one or more radius histogram scores include an in/out ratio, a full width at maximum height (FWHM), a peak height, a signal to mean ratio (SMR), a radius difference between a peak and a secondary peak, a height difference between the peak and the secondary peak, or a combination thereof.

Example 14 includes the method of Example 13, further including: based on the one or more radius histogram scores satisfying one or more thresholds, scoring, by the one or more processors, one of the one or more candidate centers as correctly estimating an actual center of the connector.

Example 15 includes the method of any of Examples 11 to 14, further including: generating, by the one or more processors, an intensity gradient image based on the thermal image, wherein the one or more histograms are generated based on the intensity gradient image.

Example 16 includes the method of Example 15, further including: thresholding, by the one or more processors, the thermal image to generate a thresholded thermal image that includes pixels associated with intensities that satisfy a threshold.

Example 17 includes the method of any of Examples 11 to 16, wherein the thermal imaging sensor and the one or more processors are integrated in an autonomous aircraft or a semi-autonomous aircraft.

According to Example 18, a non-transitory, computer readable medium stores instructions that, when executed by one or more processors, cause the one or more processors to perform operations including: obtaining one or more candidate centers of a connector depicted in a thermal image; generating one or more histograms that represent alignment of normal edge vectors to radial vectors through the one or more candidate centers for one or more pixels in the thermal image; estimating a radius based on the one or more histograms; and outputting one or more scores indicative of a confidence that the estimated radius corresponds to the connector.

Example 19 includes the non-transitory, computer readable medium of Example 18, wherein the connector trails behind at least a portion of a vehicle in the thermal image.

Example 20 includes the non-transitory, computer readable medium of Example 19, wherein generating the one or more histograms includes, while iterating through pixels in a region of interest: generating an alignment score associated with the pixel; and generating an alignment score associated with the pixel; and adding the alignment score to an entry in the one or more histograms associated with a distance between the pixel and one of the one or more candidate centers.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:

a thermal imaging sensor configured to generate a thermal image depicting a connector; and a vision processor coupled to the thermal imaging sensor, wherein the vision processor is configured to:

obtain one or more candidate centers of the connector in the thermal image;

generate one or more histograms that represents alignment of normal edge vectors to radial vectors through the one or more candidate centers for one or more pixels in the thermal image;

estimate a radius based on the one or more histograms; and output one or more scores indicative of a confidence that the estimated radius corresponds to the connector.

2. The device of claim 1, wherein, to generate a histogram of the one or more histograms for a candidate center of the one or more candidate centers, the vision processor is further configured to, for each pixel of a first set of pixels that are a first distance from the candidate center:

generate a normal edge vector through the pixel in a same direction as a gradient direction associated with the pixel;

generate a radial vector from the candidate center to the pixel;

generate an alignment score associated with the pixel based a projection of the normal edge vector onto the radial vector; and add the alignment score to an entry in the histogram associated with the first distance.

3. The device of claim 2, wherein the gradient direction of the pixel corresponds to a direction in which pixel intensity has the highest change from the pixel to any adjacent pixel.

4. The device of claim 2, wherein the vision processor is further configured to:

determine one or more radius histogram scores based on the histogram, wherein the one or more radius histogram scores include an in/out ratio, a full width at maximum height (FWHM), a peak height, a signal to mean ratio (SMR), a radius difference between a peak and a secondary peak, a height difference between the peak and the secondary peak, or a combination thereof.

5. The device of claim 4, wherein the vision processor is further configured to:

based on the one or more radius histogram scores satisfying one or more thresholds, score one of the one or more candidate centers as correctly estimating an actual center of the connector.

6. The device of claim 1, wherein the vision processor is further configured to:

generate an intensity gradient image based on the thermal image, and wherein the one or more histograms are generated based on the intensity gradient image.

7. The device of claim 6, wherein the vision processor is further configured to:

threshold the thermal image to generate a thresholded thermal image that includes pixels associated with intensities that satisfy a threshold.

8. The device of claim 1, wherein the connector trails behind at least a portion of a vehicle in the thermal image.

9. The device of claim 1, wherein, to generate the one or more histograms, the vision processor is configured to, while iterating through pixels in a region of interest:

generate an alignment score associated with the pixel; and add the alignment score to an entry in the one or more histograms associated with a distance between the pixel and one of the one or more candidate centers.

10. The device of claim 1, wherein the thermal imaging sensor and the vision processor are integrated in an autonomous aircraft or a semi-autonomous aircraft.

11. A method comprising:

obtaining, via a thermal imaging sensor, a thermal image depicting a connector;

obtaining, by one or more processors, one or more candidate centers of the connector in the thermal image;

generating, by the one or more processors, one or more histograms that represent alignment of normal edge vectors to radial vectors through the one or more candidate centers for one or more pixels in the thermal image;

estimating, by the one or more processors, a radius based on the one or more histograms; and outputting, by the one or more processors, one or more scores indicative of a confidence that the estimated radius corresponds to the connector.

12. The method of claim 11, wherein generating a histogram of the one or more histograms for a candidate center of the one or more candidate centers comprises, for each pixel of a first set of pixels that are a first distance from the candidate center:

generating, by the one or more processors, a normal edge vector through the pixel in a same direction as a gradient direction associated with the pixel;

generating, by the one or more processors, a radial vector from the candidate center to the pixel;

generating, by the one or more processors, an alignment score associated with the pixel based a projection of the normal edge vector onto the radial vector; and adding, by the one or more processors, the alignment score to an entry in the histogram associated with the first distance.

13. The method of claim 12, further comprising:

determining, by the one or more processors, one or more radius histogram scores based on the histogram, wherein the one or more radius histogram scores include an in/out ratio, a full width at maximum height (FWHM), a peak height, a signal to mean ratio (SMR), a radius difference between a peak and a secondary peak, a height difference between the peak and the secondary peak, or a combination thereof.

14. The method of claim 13, further comprising:

based on the one or more radius histogram scores satisfying one or more thresholds, scoring, by the one or more processors, one of the one or more candidate centers as correctly estimating an actual center of the connector.

15. The method of claim 11, further comprising:

generating, by the one or more processors, an intensity gradient image based on the thermal image, wherein the one or more histograms are generated based on the intensity gradient image.

16. The method of claim 15, further comprising:

thresholding, by the one or more processors, the thermal image to generate a thresholded thermal image that includes pixels associated with intensities that satisfy a threshold.

17. The method of claim 11, wherein the thermal imaging sensor and the one or more processors are integrated in an autonomous aircraft or a semi-autonomous aircraft.

18. A non-transitory, computer readable medium storing instructions that, when executed by one or more processors, cause the one or more processors to perform operations comprising:

obtaining one or more candidate centers of a connector depicted in a thermal image;

generating one or more histograms that represent alignment of normal edge vectors to radial vectors through the one or more candidate centers for one or more pixels in the thermal image;

estimating a radius based on the one or more histograms; and outputting one or more scores indicative of a confidence that the estimated radius corresponds to the connector.

19. The non-transitory, computer readable medium of claim 18, wherein the connector trails behind at least a portion of a vehicle in the thermal image.

20. The non-transitory, computer readable medium of claim 18, wherein generating the one or more histograms comprises, while iterating through pixels in a region of interest:

generating an alignment score associated with the pixel; and adding the alignment score to an entry in the one or more histograms associated with a distance between the pixel and one of the one or more candidate centers.

* * * * *